US012500646B2

(12) United States Patent
Zhou et al.

(10) Patent No.: US 12,500,646 B2
(45) Date of Patent: Dec. 16, 2025

(54) BEAM FAILURE RECOVERY WITH A RELAY DEVICE

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 960 days.

(21) Appl. No.: 17/651,697

(22) Filed: Feb. 18, 2022

(65) Prior Publication Data

US 2023/0268972 A1    Aug. 24, 2023

(51) Int. Cl.
*H04B 7/06* (2006.01)
*H04L 1/08* (2006.01)
*H04W 76/19* (2018.01)
*H04W 76/20* (2018.01)
*H04W 92/18* (2009.01)

(52) U.S. Cl.
CPC .......... *H04B 7/0695* (2013.01); *H04L 1/08* (2013.01); *H04W 76/19* (2018.02); *H04W 76/20* (2018.02); *H04W 92/18* (2013.01)

(58) Field of Classification Search
CPC . H04B 7/0695; H04B 7/06964; H04W 76/19; H04W 76/20; H04W 92/18; H04W 16/28; H04W 76/14; H04W 88/04; H04L 1/08
See application file for complete search history.

(56) References Cited

U.S. PATENT DOCUMENTS

| 12,107,655 | B2 * | 10/2024 | Tao ..................... H04B 7/0626 |
| 2017/0317740 | A1 * | 11/2017 | Basu Mallick ....... H04W 8/005 |
| 2019/0044604 | A1 * | 2/2019 | Huang ................. H04B 7/0452 |
| 2019/0173740 | A1 * | 6/2019 | Zhang ................ H04L 41/0677 |
| 2019/0200337 | A1 * | 6/2019 | Zhou ..................... H04L 5/0055 |
| 2020/0028603 | A1 * | 1/2020 | Wang ................... H04L 5/0057 |
| 2020/0153542 | A1 * | 5/2020 | Zhou ..................... H04B 7/0617 |
| 2023/0084028 | A1 * | 3/2023 | Karimidehkordi ......................... H04B 7/06964 370/216 |
| 2023/0308909 | A1 * | 9/2023 | Kim ...................... H04W 76/14 |

* cited by examiner

*Primary Examiner* — Ian N Moore
*Assistant Examiner* — Latresa A Mccallum
(74) *Attorney, Agent, or Firm* — Procopio, Cory, Hargreaves & Savitch LLP/Qualcomm

(57) ABSTRACT

A UE may be configured to detect an occurrence of a beam failure condition for a failed downlink transmission received from a network entity using a first beam. The UE may transmit, over a sidelink to a second UE, a BFR in response to detecting the beam failure condition. The UE may receive, over the sidelink from the second UE or from the network entity, a beam switching instruction to switch from the first beam to a second beam. The UE may receive, from the network entity, a retransmission of the failed downlink transmission using the second beam.

30 Claims, 23 Drawing Sheets

BEAM FAILURE RECOVERY WITH A RELAY DEVICE

TECHNICAL FIELD

The present disclosure relates generally to communication systems, and more particularly, to a beam failure recovery system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for wireless communication at a first user equipment (UE) are provided. The apparatus may have a memory and at least one processor coupled to the memory and configured to detect an occurrence of a beam failure condition for a failed downlink transmission received from a network entity using a first beam. The at least one processor may be further configured to transmit, over a sidelink to a second UE, a beam failure report (BFR) in response to detecting the beam failure condition. The at least one processor may be further configured to receive, over the sidelink from the second UE or from the network entity, a beam switching instruction to switch from the first beam to a second beam. The at least one processor may be further configured to receive, from the network entity, a retransmission of the failed downlink transmission using the second beam.

In an aspect of the disclosure, a method, a computer-readable medium, and an apparatus for wireless communication at a network entity are provided. The apparatus may have a memory and at least one processor coupled to the memory and configured to transmit, to a first UE using a first beam, a reference downlink transmission. The at least one processor may be further configured to receive, from a second UE, a BFR uplink transmission including a BFR for the reference downlink transmission. The at least one processor may be further configured to transmit, to the first or second UE, a beam switching instruction downlink transmission to switch from the first beam to a second beam. The at least one processor may be further configured to retransmit, to the first UE, the reference downlink transmission using the second beam.

In an aspect of the disclosure, a method, a computer-readable medium, and an apparatus for wireless communication at a second UE are provided. The apparatus may have a memory and at least one processor coupled to the memory and configured to receive, over a sidelink from a first UE, a BFR addressed to a network entity. The at least one processor may be further configured to transmit, to the network entity, a BFR uplink transmission including the BFR addressed to the network entity. The at least one processor may be further configured to receive, from the network entity, a beam switching instruction downlink transmission including a beam switching instruction addressed to the first UE. The at least one processor may be further configured to transmit, over the sidelink to the first UE, the beam switching instruction including the beam switching instruction addressed to the first UE.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
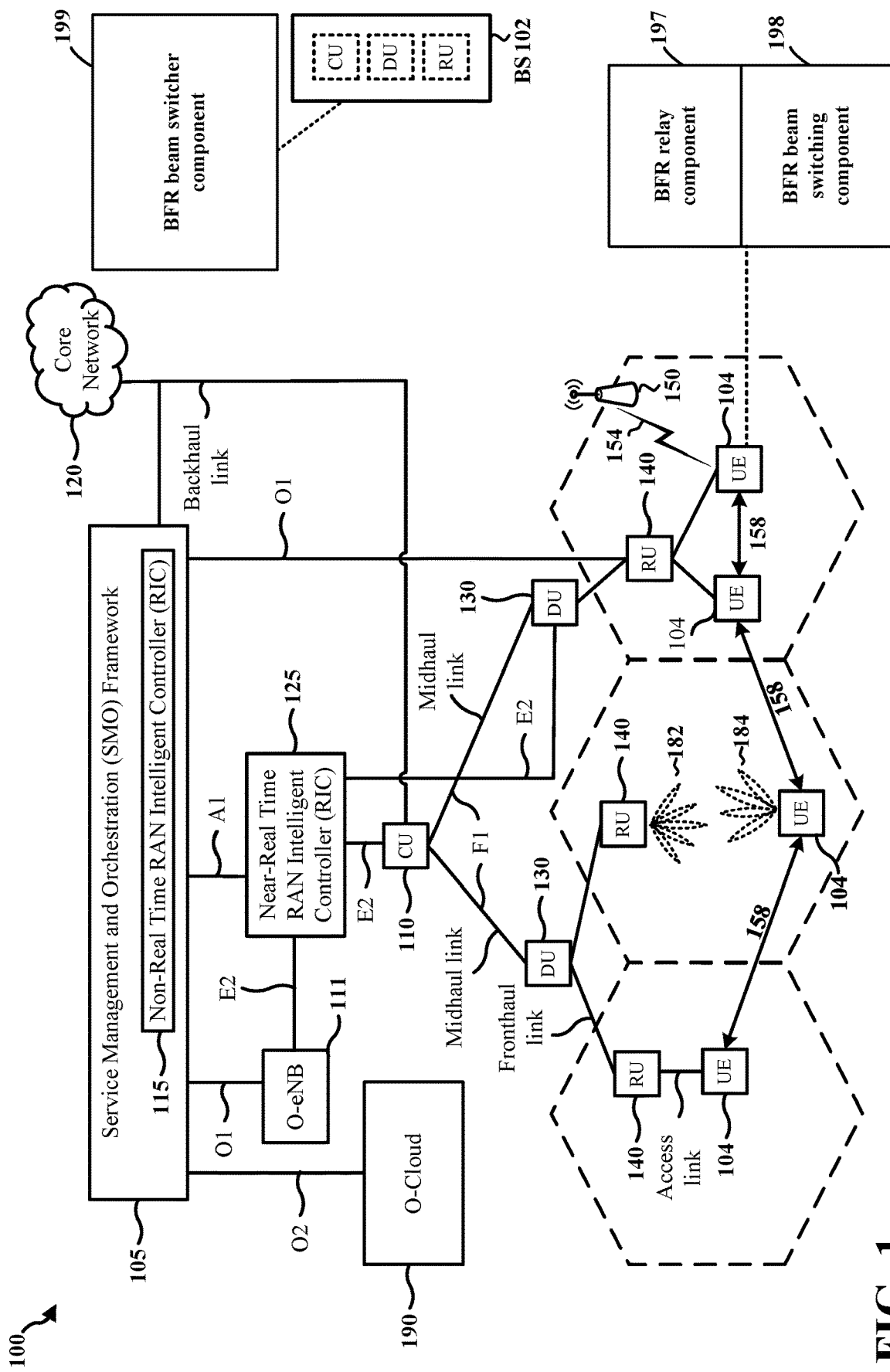
FIG. 1 is a diagram illustrating an example of a wireless communications system and an access network.

In wireless network systems, for example systems that use a 5G NR telecommunication standard, a transmitter and a receiver may use one or more beams to facilitate data transmission. However, due to the uncertain nature of wireless environments or due to blocking of beams, data transmission using such beams may be vulnerable to beam failure. In response to detecting a beam failure, a wireless device may perform a beam failure recovery procedure to generate a BFR that may assist a UE in maintaining a strong channel connection with a network entity, such as a base station. A UE may perform a random access channel (RACH) process with a network entity as part of a BFR procedure to reestablish a connection to a network entity using a new beam pair. However, the RACH procedure may be time consuming and/or may be power consuming. Use of such a RACH procedure may also increase transmission delays and/or may downgrade service quality.

Aspects presented herein improve beam failure reporting a beam failure recovery through a source UE that experiences a beam failure with a network entity by providing a BFR to the network entity through a relay UE. The source UE that experiences the beam failure may transmit the BFR to the relay UE via sidelink for delivery to the network entity using the relay UE's working Uu link. The network entity may coordinate a new beam with the source UE via the relay UE.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links (e.g., a Uu link). In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or may be functionally coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, or one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 may provide an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR. The UEs 104 may be connected to one another using a PC5 interface to maintain the D2D communication link 158.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. A V2X communication may include a basic safety message (BSM) Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a first UE 104 may be configured to initiate a BFR sidelink request using a BFR beam switching component 198 that is configured to (1) detect an occurrence of a beam failure condition for a failed downlink transmission received from a base station 102 using a first beam and to (2) transmit, over a sidelink to a second UE 104, a BFR in response to detecting the beam failure condition. The UE 104 may be further configured to receive, over the sidelink from the second UE

104 or from the base station 102, a beam switching instruction to switch from the first beam to a second beam and to receive, from the base station 102, a retransmission of the failed downlink transmission using the second beam.

In certain aspects, the base station 102, or a component of a base station (such as CU 110, DU 130 and/or RU 140), or a combination of components of a base station, may be configured to configure a BFR activation condition using a BFR beam switcher component 199 that is configured to (1) receive, from a second UE 104, a BFR uplink transmission comprising a BFR for a reference downlink transmission transmitted to a first UE 104 and to (2) transmit, to the first UE 104 or second UE 104, a beam switching instruction downlink transmission to switch from the first beam to a second beam. The base station 102, or component or combination of components of a base station 102, may be configured to transmit, to a first UE 104 using a first beam, a reference downlink transmission before receiving the BFR and to retransmit, to the first UE 104, the reference downlink transmission using the second beam after receiving the BFR.

In some aspects, a second UE 104 may include a BFR relay component 197 that may be configured to (1) receive, over a sidelink from a first UE 104, a BFR addressed to a base station 102 and to (2) transmit, to the base station 102, a BFR uplink transmission comprising the BFR addressed to the base station 102. The UE 104 may be further configured to receive, from the base station 102, a beam switching instruction downlink transmission including a beam switching instruction addressed to the first UE 104 and to transmit, over the sidelink to the first UE 104, the beam switching instruction comprising the beam switching instruction addressed to the first UE 104. Although the following description may be focused on 5G NR, the concepts described herein may be applicable to other similar multi-connectivity scenarios, such as LTE, LTE-A, CDMA, GSM, and other wireless technologies.

While FIG. 1 shows each UE 104 including both a BFR relay component 197 and a BFR beam switching component 198, a UE 104 may be configured to have a BFR relay component 197 without having a BFR beam switching component 198, or may be configured to have a BFR beam switching component 198 without having a BFR relay component 197. For example, the source UE 502 in FIG. 5 may be configured to have a BFR beam switching component 198 without having a BFR relay component 197 and the relay UE 504 in FIG. 5 may be configured to have a BFR relay component 197 without having a BFR beam switching component 198. In another aspect, both the source UE 502 and the relay UE 504 in FIG. 5 may be configured to have both a BFR relay component 197 and a BFR beam switching component 198.

The base stations 102 configured for 4G LTE (collectively referred to as Evolved Universal Mobile Telecommunications System (UMTS) Terrestrial Radio Access Network (E-UTRAN)) may interface with other devices, such as other base stations 102 or an EPC, through backhaul links (e.g., S1 interface). The base stations 102 configured for 5G NR (collectively referred to as Next Generation RAN (NG-RAN)) may interface with core network 120 through backhaul links. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, MBMS, subscriber and equipment trace, RAN information management (RIM), paging, positioning, and delivery of warning messages. The base stations 102 may communicate directly or indirectly (e.g., through core network 120) with each other. The backhaul links may be wired or wireless.

Figure 2:
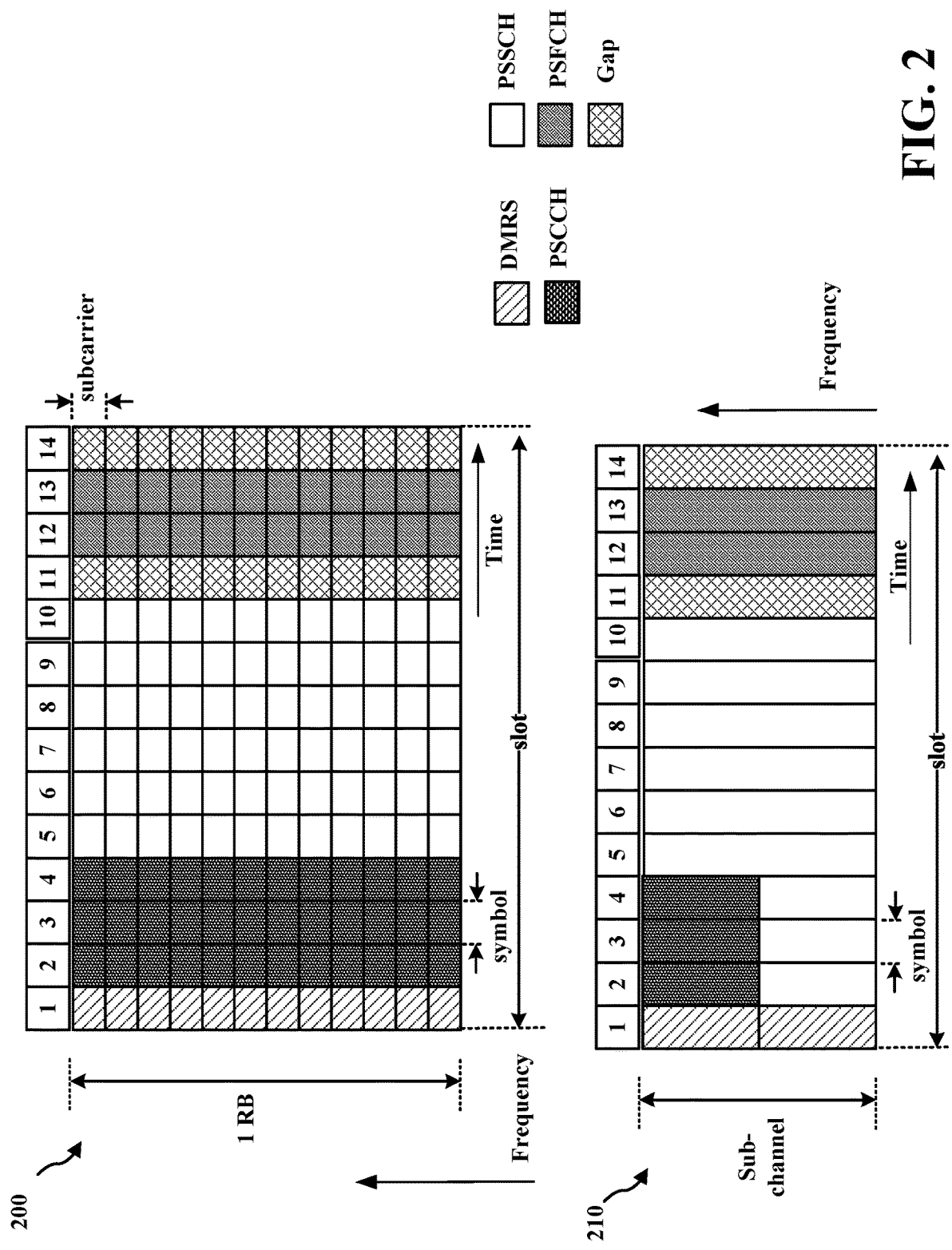
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., communication link 158 between UEs 104). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 2. Multiple slots may be aggregated together in some aspects.

Figure 3:
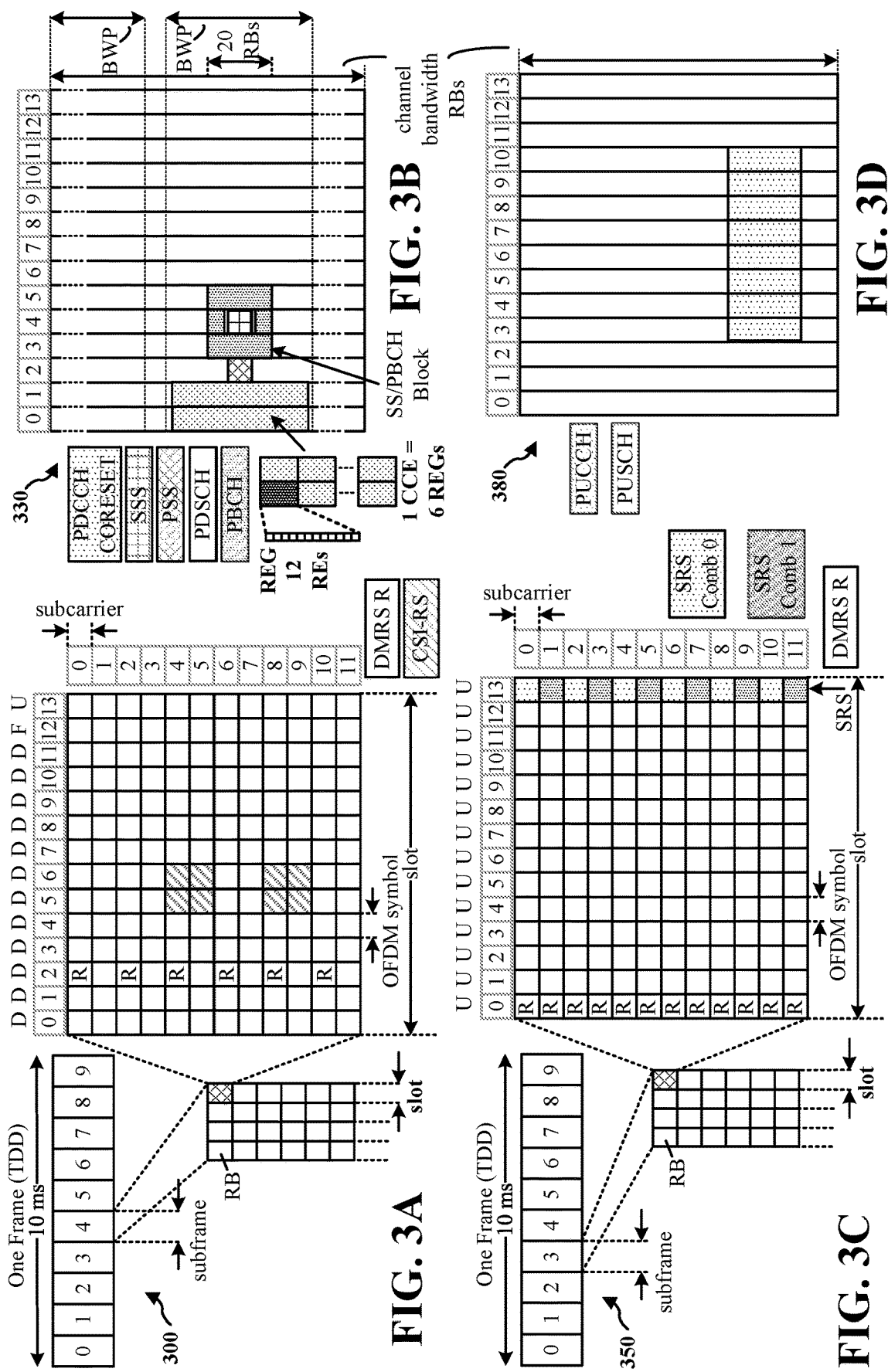
FIG. 3A is a diagram illustrating an example of a first frame, in accordance with various aspects of the present disclosure.
FIG. 3B is a diagram illustrating an example of DL channels within a subframe, in accordance with various aspects of the present disclosure.
FIG. 3C is a diagram illustrating an example of a second frame, in accordance with various aspects of the present disclosure.
FIG. 3D is a diagram illustrating an example of UL channels within a subframe, in accordance with various aspects of the present disclosure.

FIG. 3A is a diagram 300 illustrating an example of a first subframe within a 5G NR frame structure. FIG. 3B is a diagram 330 illustrating an example of DL channels within a 5G NR subframe. FIG. 3C is a diagram 350 illustrating an example of a second subframe within a 5G NR frame structure. FIG. 3D is a diagram 380 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 3A, 3C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 may include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 3A-3D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 3A-3D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 3B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 4:
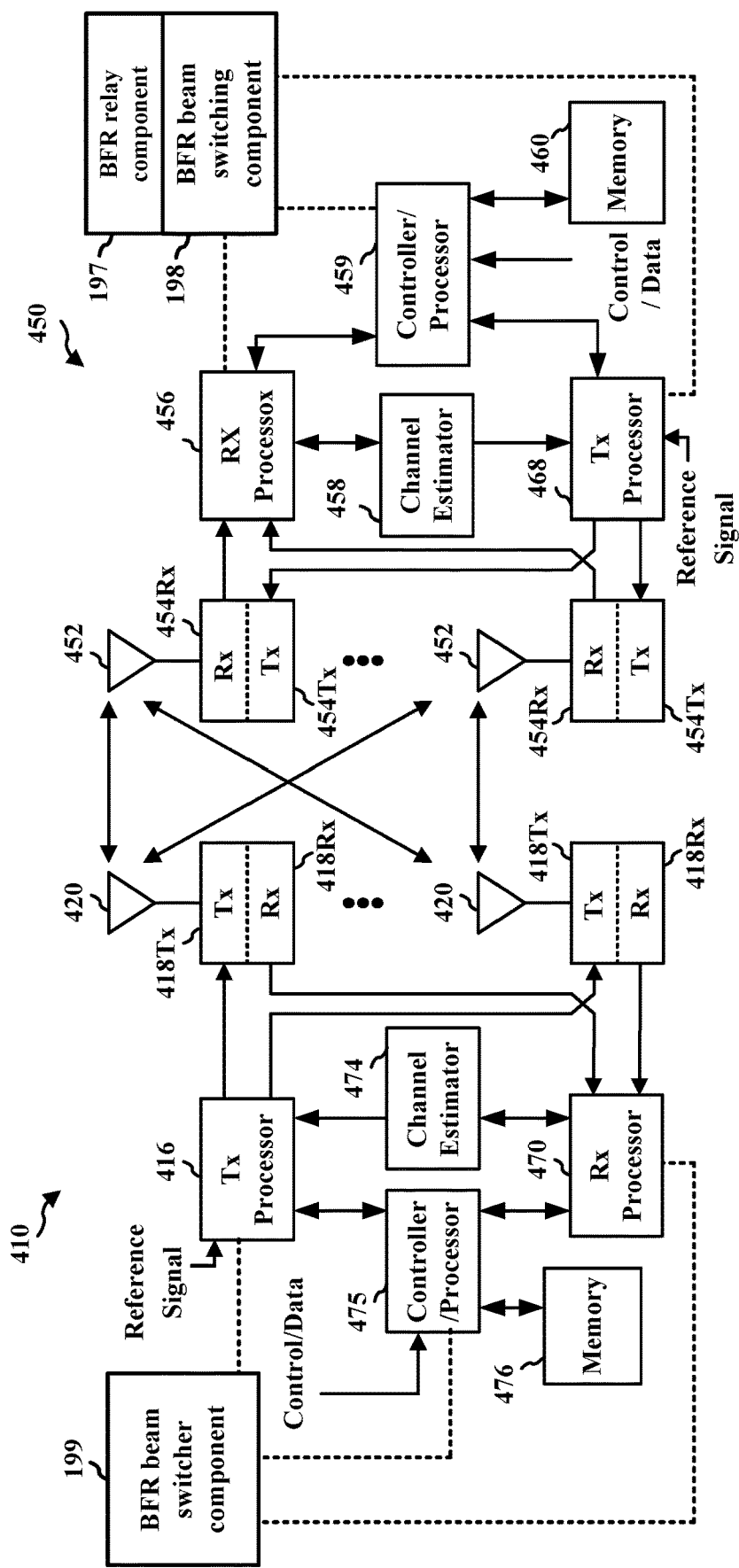
FIG. 4 is a diagram illustrating an example of a base station and user equipment (UE) in an access network.

FIG. 4 is a block diagram of a base station 410 in communication with a UE 450 in an access network. In the DL, Internet protocol (IP) packets may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 416 and the receive (Rx) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418Tx. Each transmitter 418Tx may modulate a radio frequency (RF) carrier with a respective spatial stream for transmission.

At the UE 450, each receiver 454Rx receives a signal through its respective antenna 452. Each receiver 454Rx recovers information modulated onto an RF carrier and provides the information to the receive (Rx) processor 456. The Tx processor 468 and the Rx processor 456 implement layer 1 functionality associated with various signal processing functions. The Rx processor 456 may perform spatial processing on the information to recover any spatial streams destined for the UE 450. If multiple spatial streams are destined for the UE 450, they may be combined by the Rx processor 456 into a single OFDM symbol stream. The Rx processor 456 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the Tx processor 468 to select the appropriate coding and modulation schemes, and to facilitate spatial processing. The spatial streams generated by the Tx processor 468 may be provided to different antenna 452 via separate transmitters 454Tx. Each transmitter 454Tx may modulate an RF carrier with a respective spatial stream for transmission.

The UL transmission is processed at the base station 410 in a manner similar to that described in connection with the receiver function at the UE 450. Each receiver 418Rx receives a signal through its respective antenna 420. Each receiver 418Rx recovers information modulated onto an RF carrier and provides the information to a Rx processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets. The controller/processor 475 is also responsible for error detection using an ACK and/or NACK protocol to support HARQ operations.

At least one of the Tx processor 468, the Rx processor 456, and the controller/processor 459 may be configured to perform aspects in connection with BFR beam switching component 197 of FIG. 1.

At least one of the Tx processor 468, the Rx processor 456, and the controller/processor 459 may be configured to perform aspects in connection with BFR beam switching component 198 of FIG. 1.

At least one of the Tx processor 416, the Rx processor 470, and the controller/processor 475 may be configured to perform aspects in connection with BFR beam switcher component 199 of FIG. 1.

In wireless network systems, for example systems that use a 5G New Radio (NR) telecommunication standard, a transmitter and a receiver may use one or more beams to facilitate data transmission. However, due to the uncertain nature of wireless environments or due to blocking of beams, data transmission using such beams may be vulnerable to beam failure. In response to detecting a beam failure, a wireless device may generate a BFR (also known as a beam failure recovery report) to assist in a beam failure recovery procedure to allow a UE to maintain a strong channel connection with a network entity, such as a base station. A UE may perform a random access channel (RACH) process with a network entity as part of a beam failure recovery procedure to reestablish a connection to a network entity using a new beam pair. However, the RACH procedure may be time consuming and/or may be power consuming. Use of such a RACH procedure may also increase transmission delays and/or may downgrade service quality.

In a multi-connectivity scenario (e.g., where two UEs are configured to communicate with the same network entity, or a shared resource of a network entity), a source UE may be configured to communicate with a relay UE. For example, two UEs 104 in FIG. 1 may be configured to communicate with a same RU 140 using a fronthaul link, and may be configured to communicate with one another using the D2D communication link 158 (e.g., a sidelink transmission channel). In another aspect, two UEs 104 may be configured to communicate with different RUs 140, the same DU 130 via the different RUs 140, and with one another using a D2D communication link 158. In another aspect, two UEs 104 may be configured to communicate with different RUs 140, different DUs 130 via the RUs 140, to the same CU 110 via the different DUs 130, and with one another using a D2D communication link 158. Each of the RU 140, DU 130, and CU 110 may be considered a network entity. The relay UE may be configured to communicate with a network entity for enhanced data service qualities. Where a source UE and a relay UE are configured to communicate with one another using a sidelink transmission channel and to a common network entity, a source UE may be able to recover a failed beam (i.e., a reliable Uu link connection) with the help of the relay UE using the sidelink transmission channel. In other words, when a source UE detects a failed beam connection with a network entity (i.e. an unreliable Uu link connection), the source UE may be configured to perform BFR using a relay UE via a reliable sidelink connection to establish a new reliable beam connection with the network entity.

Figure 5:
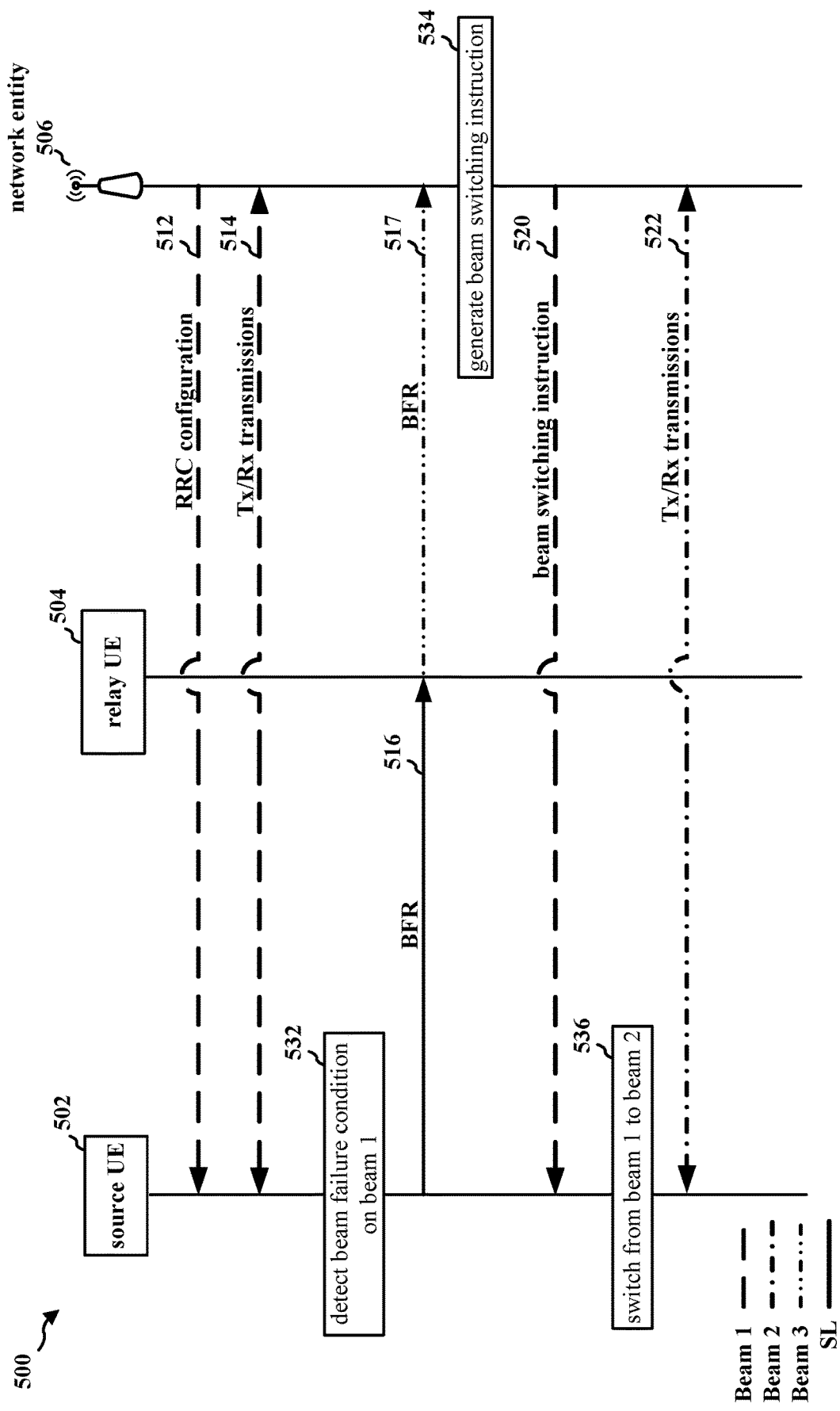
FIG. 5 shows a network connection flow diagram illustrating an example of a source UE configured to conduct a BFR relay configuration with a network entity using a relay UE.

FIG. 5 shows a network connection flow diagram 500 having a source UE 502, a relay UE 504, and a network entity 506. The network entity 506 may include, for example, a base station, or any component or combination of components of a base station, such as an RU, a DU, or a CU. For example, the network entity 506 may include a DU common to the source UE 502 and the relay UE 504, where source UE 502 may communicate with the network entity 506 via a first RU and the relay UE 504 may communicate with the network entity 506 via a second RU (i.e., the source UE 502 and the relay UE 504 may share all but the physical layer of a network entity). In another aspect, the network entity 506 may include a common RU configured to communicate with both the source UE and the relay UE, for example in full duplex mode. In one aspect, the network entity 506 may comprise a common RU, PHY layer of an RU, DU, MAC layer of a DU, RLC layer of a DU, CU, PDCP layer of a CU, and/or an RRC layer of a CU.

The source UE 502 may be configured to communicate with the network entity 506 using a first beam (beam 1), the relay UE 504 may be configured to communicate with the network entity 506 using a third beam (beam 3), and the source UE 502 may be configured to communicate with the relay UE 504 using a sidelink channel (SL channel). For example, the source UE 502 and the relay UE 504 may each use a direct Uu interface link to communicate with the network entity 506. Further, the source UE 502 and the relay UE 504 may communicate with one another using a PC5 interface that provides sidelink communication. In other words, the source UE 502 may be configured to connect directly to the network entity 506 directly using a Uu link, and indirectly through a PC5 interface to the relay UE 504.

The relay UE 504 may be configured to relay transmissions between the source UE 502 and the network entity 506. For example, the source UE 502 may transmit a transmission addressed to the network entity 506 as a target destination to the relay UE 504 using the SL channel, and the relay UE 504 may then forward the transmission to the network entity 506 using the beam 3. Likewise, the network entity 506 may transmit a transmission addressed to the source UE 502 as a target destination to the relay UE 504 using the beam 3, and the relay UE 504 may then forward the transmission to the source UE 502 using the SL channel.

Network entity 506 may configure aspects of one or more BFR(s) using an RRC configuration 512 transmitted using beam 1. In one aspect, the RRC configuration 512 may configure content of a BFR, and/or may configure a periodicity of a BFR. For example, the RRC configuration 512 may provide a configuration for a BFR that instructs the source UE 502 to transmit a BFR (or an updated BFR status or a change (Δ) in BFR data since the previous BFR transmission) periodically to the network entity 506, such as after a threshold period of time has passed or in response to a detected conditional trigger (e.g., a detected beam quality metric has met or fallen below a threshold level). Providing such periodic BFR signals may provide the network entity 506 with a periodic, historical log of the source UE 502's configuration. An RRC configuration 512 may configure a plurality of BFR types, which may be selectable by the network entity 506 by using a MAC control element (MAC CE) or a DCI to switch a configuration from one BFR type identified in the RRC configuration 512 to another BFR type identified in the RRC configuration 512. For example, one report type may contain different data metrics than another report type, or one report type may report data during different time periods than another report type. The network entity 506 may configure a change from one BFR type to another BFR type as a function of one or more quality of service (QoS) requirement(s), one or more UE capability metric(s), and/or one or more power constraint(s) detected by the network entity 506. In one aspect, the network entity 506 may monitor such metrics, and may be configured to trigger an instruction (e.g., in a MAC CE or a DCI) to change from one BFR type to another BFR type in response to a change in a metric (e.g., meeting a threshold, exceeding a threshold, and/or falling below a threshold). In another aspect, the network entity 506 may be configured to provide a conditional trigger to the source UE 502, which may be configured to change from providing one BFR type to providing another BFR type based on the presence or absence of the conditional trigger.

The content of a BFR may include an indication of beam failure detected by the source UE 502, a request to perform a beam switching procedure (i.e., beam switching instruction), an indication of one or more beams that failed (i.e., a failed beam ID), an indication of one or more preferred beams to switch to (i.e., candidate beam ID), and/or a measurement history or one or more channel conditions of the source UE 502 (i.e., channel condition measurement history). The source UE 502 may be configured to measure metrics (e.g., pathloss, reference signal received power (RSRP), received signal strength indicator (RSSI), reference signal received quality (RSRQ), signal-to-noise and interference ratio (SINR)) related to one or more beams transmitted to, and/or received by, the source UE 502, such as beam 1 and beam 2, and include such metrics in a BFR. The BFR may be transmitted as a MAC CE (BFR MAC CE) transmission. Such a MAC CE may be transmitted using any suitable transmission channel, such as a sidelink channel to relay UE 504 or a Uu link to network entity 506. The BFR MAC CE may include a UE indicated beam switching instruction for the source UE 502. In some aspects, the BFR may include RACH information transmitted using a MAC CE configured to be transmitted to the relay UE 504 for transmission to the network entity 506.

The source UE 502 may be configured to communicate with the network entity 506 by transmitting and receiving Tx/Rx transmissions 514 using beam 1. For example, the RRC configuration 512 may also be used to configure the source UE 502 to use beam 1 to transmit and receive Tx/Rx transmissions 514. The source UE 502 may periodically transmit BFR to the network entity 506 using beam 1 as one of the Tx/Rx transmission 514 to ensure that the network entity 506 is periodically updated regarding the BFR status of the source UE 502.

At 532, the source UE 502 may detect an occurrence of a beam failure condition for a failed downlink transmission received from the network entity 506 using beam 1. For example, the source UE 502 may fail to properly decode a received PDSCH transmission. The source UE 502 may then transmit a BFR 516 using the sidelink to the relay UE 504, and the relay UE 504 may transmit the BFR 517 using beam 3 to the network entity 506. The BFR 516 may be addressed to the network entity 506 as a target destination, and the relay UE 504 may then forward the BFR 517 to the network entity 506 in response to determining that the BFR 516 is addressed to the network entity 506 as a target destination. In other words, the source UE 502 may be configured to send the BFR through the relay UE 504 to the network entity 506. By configuring the source UE 502 to send the BFR through the relay UE 504, the source UE 502 does not need to use a RACH procedure that may be more time/power consuming than transmitting the BFR 516 to the relay UE 504. The BFR 516 may include a beam switching instruction to switch the beam of the source UE 502 from the beam 1. In some aspects, the BFR 516 may indicate one or more preferred beams (or an identifier of one or more preferred beams, such as an identifier of beam 2) for the source UE 502. The BFR 516 may be included in a MAC CE. The MAC CE may be an existing MAC CE that includes the BFR 516, or may be a new MAC CE generated by the source UE 502 for the relay UE 504

In one aspect, the source UE 502 may be configured to transmit the BFR 516 to the relay UE 504 via a MAC CE using a sidelink channel. The BFR 516 may be addressed to the network entity 506 as a target destination. The relay UE 504 may be configured to transmit the BFR 517 to the network entity 506 via a MAC CE or a UCI using beam 3. The BFR 517 may also be addressed to the network entity 506 as a target destination.

At 534, in response to the network entity 506 receiving the BFR 517 from the relay UE 504 using beam 3, the network entity 506 may generate a beam switching instruction 520 for the source UE 502. Since a new beam (beam 2) may be indicated via beam switching instead of a RACH response, utilizing the relay UE 504 to initiate a beam switch may be faster and/or more power efficient than using a RACH response.

The network entity 506 may select the new beam 2 using any suitable means. For example, the network entity 506 may receive one or more preferred beams from the source UE 502 in the BFR 516/517, and may select one of the preferred beams that the source UE 502 indicates. The network entity 506 may be configured to select a beam that is not indicated as a preferred beam in the BFR 516/517 based upon an environmental condition (e.g., the network entity 506 detects that an indicated beam is currently being used to communicate with a different UE). In another aspect, the network entity 506 may select a beam as a function of historical data (e.g., channel condition measurement history) gathered via BFR content from one or more UEs, including the source UE 502. Such BFR content may be provided periodically to the network entity 506. In one aspect, the network entity 506 may select a beam that has historically had the lowest volume of failed transmissions for the source UE 502 according to a channel condition measurement history.

The network entity 506 may transmit a beam switching instruction 520 using beam 1 to the source UE 502. The beam switching instruction may be encoded within a MAC CE or a DCI transmission. At 536 the source UE 502 may perform a beam switching procedure to switch from using beam 1 to using beam 2. The source UE 502 may then be configured to communicate with the network entity 506 by transmitting and receiving Tx/Rx transmissions 522 with network entity 506 using beam 2. For example, the source UE 502 may transmit PUCCH information for a failed downlink transmission of the Tx/Rx transmissions 514 using beam 1 to the network entity 506 as one of the Tx/Rx transmissions 522 using beam 2. In response to receiving the PUCCH information, the network entity 506 may retransmit a failed Rx transmission from Tx/Rx transmissions 514 to the source UE 502 using beam 2 via Tx/Rx transmissions 522. In other words, the source UE 502 and the network entity 506 may be configured to transmit future data and control transmissions using beam 2 after the source UE 502 switches from beam 1 to beam 2 at 536.

Devices in a multi-connectivity network, such as the source UE 502, relay UE 504, and the network entity 506, may not always be configured to use a relay UE 504 to forward BFR transmissions (i.e., use a BFR relay configuration). Use of relay UEs to forward BFR transmissions may be a feature that is activated or deactivated in response to detected environmental conditions and/or conditional triggers. For example, a device may be configured to activate/deactivate a BFR relay configuration based on one or more QoS requirement(s) of serving traffic, one or more UE discontinuous reception (DRX) metric(s) (e.g., a length of a DRX cycle, an ON duration, an OFF duration, whether the SL channel is online), one or more power constraint(s) of the UE, one or more capacity constraint(s) of the UE, and/or one or more capability constraint(s) of the UE. For example, the source UE 502 may be configured to activate the BFR relay configuration in response to determining that a QoS metric has met or fallen below a threshold level, or the source UE 502 may be configured to deactivate the BFR relay configuration in response to determining that a QoS metric has met or exceeded a threshold level. In one aspect, the source UE 502 may be configured to activate/deactivate the BFR relay configuration in response to detecting a BFR activation condition based on at least one detected UE metric, such as a battery power, storage capacity, or a UE capability of the source UE 502. For example, the source UE 502 may be configured to activate the BFR relay configuration in response to determining that a battery power of the source UE 502 has met or exceeded a threshold level, or the source UE 502 may be configured to deactivate the BFR relay configuration in response to determining that a battery power of the source UE 502 has met or fallen below a threshold level. In one aspect, the network entity 506 may be configured to activate/deactivate the BFR relay configuration in response to detecting a BFR activation condition based on at least one detected metric, such as length of a DRX cycle of the source UE 502, an on duration of the source UE 502, or an off duration of the source UE 502. For example, the network entity 506 may be configured to activate the BFR relay configuration in response to determining that an ON duration length of a DRX cycle has met or exceeded a threshold level or may be configured to deactivate the BFR relay configuration in response to determining that an OFF duration length of a DRX cycle has met or exceeded a threshold level. In other words, in response to detecting a BFR activation condition based on a detected environmental condition and/or a conditional trigger (e.g., a battery power of the source UE 502, a storage capacity of the source UE 502, a UE capability of the source UE 502), an activation/deactivation instruction may be transmitted by the source UE 502 to the network entity 506 or vice versa.

The source UE 502 may be configured to activate/deactivate the BFR relay configuration or the network entity 506 may be configured to activate/activate the BFR relay configuration in any suitable manner. For example, the network entity 506 may be configured to activate or deactivate the BFR relay configuration using a MAC CE or DCI transmission (e.g., activate in an Rx transmission of the Tx/Rx transmissions 514, deactivate in an Rx transmission of the Tx/Rx transmissions 522). In response to receiving (i.e., determining receipt of) the activate/deactivate instruction, the source UE 502 may activate/deactivate, respectively, transmitting a BFR 516 to the relay UE 504 using the SL channel as opposed to initiating a RACH procedure with the network entity 506 upon detecting a beam failure condition. In another aspect, the source UE 502 may be configured to activate or deactivate the BFR relay configuration using a MAC CE or a UCI transmission (e.g., activate in a Tx transmission of the Tx/Rx transmissions 514, deactivate in a Tx transmission of the Tx/Rx transmissions 522). In response to receiving (i.e., determining receipt of) the activate/deactivate instruction, the network entity 506 may activate/deactivate, respectively, accepting a BFR from the relay UE 504 using beam 3 as opposed to responding to a RACH procedure request from the source UE 502.

While network connection flow diagram 500 shows beam 2 as different from beam 1 and beam 3, the relay UE 504 may be configured to use the same beam that the source UE 502 was using that had the failure condition, or may be configured to use the same beam that the source UE 502 switches to at 536. For example, the relay UE 504 and the source UE 502 may be configured to communicate with the network entity 506 using the same beam (to the same RC or to different RCs), and the source UE 502 may detect a beam failure condition on that beam, and may then receive a beam switching instruction 520 to use a different beam. In another aspect, the relay UE 504 and the source UE 502 may be configured to communicate with the network entity 506 using different beams, and the source UE 502 may receive a beam switching instruction 520 to use the same beam that the relay UE 504 is using to communicate with the network entity 506. In other words, beam 1 and beam 3 may be the same beam or beam 2 and beam 3 may be the same beam.

While the network connection flow diagram 500 illustrates a series of steps that may allow a source UE 502 that detects a beam failure condition to rapidly initiate a beam switching procedure upon detecting a beam failure condition at 532, the source UE 502 may fail to successfully receive and/or decode the beam switching instruction 520 sent from the network entity 506 using the beam 1. In some aspects, a network entity may be configured to transmit the beam switching instruction 520 in a more reliable manner via the relay UE 504.

Figure 6:
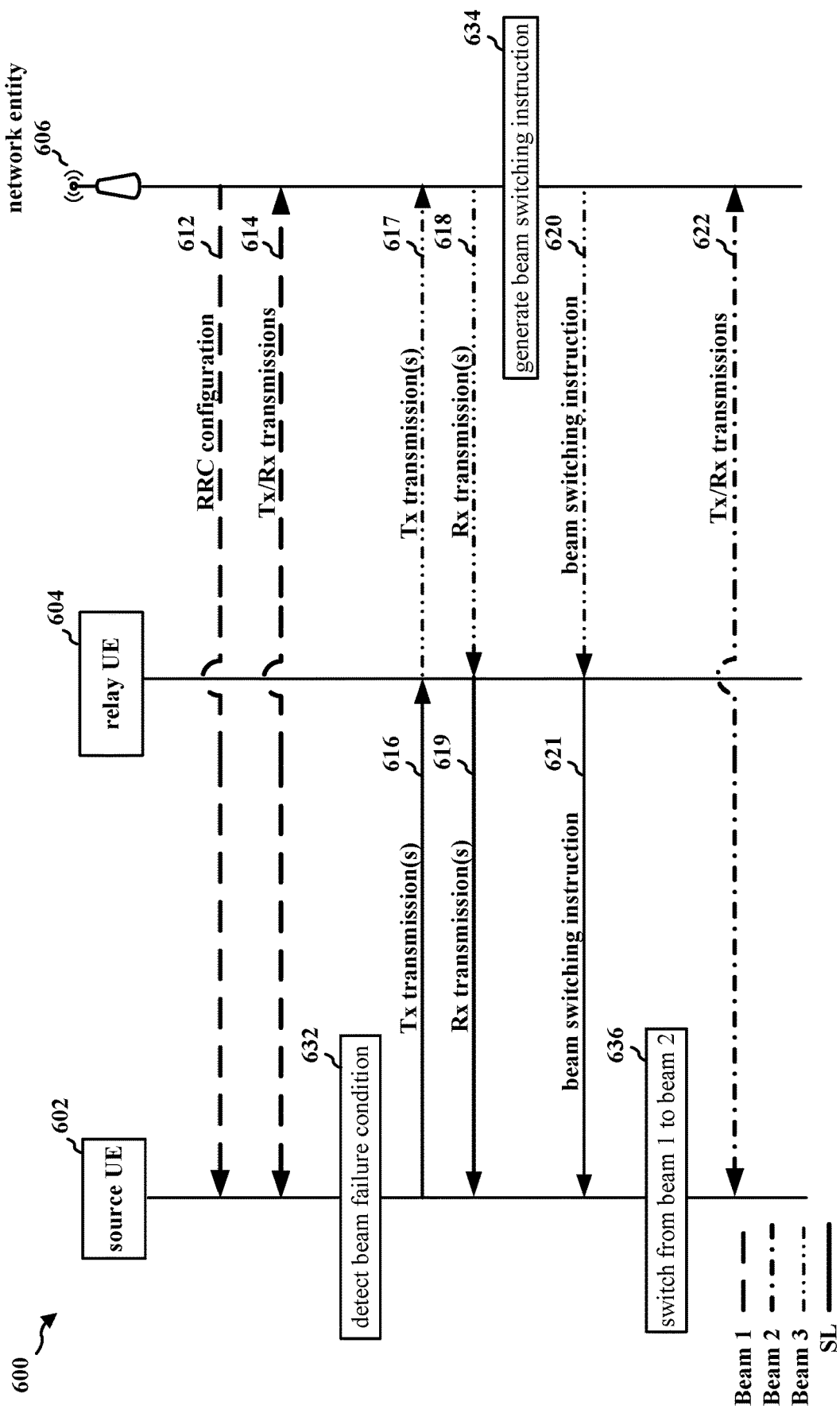
FIG. 6 shows an alternative network connection flow diagram illustrating an example of a source UE configured to conduct a BFR relay configuration with a network entity using a relay UE.

FIG. 6 shows a network connection flow diagram 600 having a source UE 602, a relay UE 604, and a network entity 606, similar to the source UE 502, relay UE 504, and network entity 506 in FIG. 5, respectively. Similarly, the network entity 606 may be configured to transmit an RRC configuration 612 to the source UE 602 using beam 1 to configure the source UE 602, such as BFR content and/or periodicity. Similarly, the source UE 602 may be configured to communicate with the network entity 606 by transmitting and receiving Tx/Rx transmissions 614 using beam 1. Such Tx/Rx transmissions 614 may include periodic BFR that are transmitted to the network entity 606 to provide a historical data log. Similarly, at 632, the source UE 602 may detect an occurrence of a beam failure condition for a failed downlink transmission received from the network entity 606 using beam 1.

In response to detecting the beam failure condition at 632, the source UE 602 may be configured to transmit data to the network entity 606 and receive data from network entity 606 using the relay UE 604 until a beam switching procedure has been completed. In other words, the source UE 602 may be configured to transmit one or more Tx transmission(s) 616 to the relay UE 604 using the SL channel, and the relay UE 604 may be configured to forward the one or more Tx transmission(s) 617 to the network entity 606 using beam 3. The Tx transmission(s) 616 and the Tx transmission(s) 617 may be addressed to the network entity 506 as a target destination. The network entity 606 may be configured to transmit one or more Rx transmission(s) 618 to the relay UE 604 using beam 3, and the relay UE 604 may be configured to forward the one or more Rx transmission(s) 619 to the source UE 602 using the SL channel. The Rx transmission(s) 618 and the Rx transmission(s) 619 may be addressed to the source UE 602 as target destination.

Using the relay UE 604, the source UE 602 may be configured to reliably transmit information, such as BFR data, ACK/NACK feedback, or other UCI messages to the network entity 606 until the beam switching procedure has been completed. In other words, the source UE 602 may be configured to temporarily transmit PUCCH information through the relay UE 604, such as PUCCH information relating to the failed downlink transmission of the Tx/Rx transmissions 614 that triggered the beam failure condition at 632. Such a configuration may also be used to help transmit PUCCH information for the BFR process and/or other data communications between the source UE and the network entity 606 until the beam switching procedure is complete.

Similar to 534 in FIG. 5, at 634, in response to the network entity 606 receiving a BFR via one or more Tx transmission(s) 617 from the relay UE 604 using beam 3, the network entity 606 may generate a beam switching instruction 620 for the source UE 602. The network entity 606 may be configured to transmit the beam switching instruction 620 using beam 3 to the relay UE 604, and the relay UE 604 may be configured to forward the beam switching instruction 621 to the source UE 602. The beam switching instruction 620 and the beam switching instruction 621 may both be addressed for source UE 602 as a target destination. The beam switching instruction may be encoded within a MAC CE or a DCI transmission for the source UE 602.

Similar to 536 in FIG. 5, at 636 the source UE 602 may perform a beam switching procedure to switch from using beam 1 to beam 2. The source UE 602 may then be configured to communicate with the network entity 606 by transmitting and receiving Tx/Rx transmissions 622 using beam 2. While the source UE 602 may then transmit PUCCH information to the network entity 606 using beam 2 and the network entity 606 may retransmit a failed Rx transmission from Tx/Rx transmissions 614 to the source UE 602 using beam 2 via Tx/Rx transmissions 622, the source UE 602 and the network entity 606 may have already transmitted such data using Tx transmission(s) 616/617 and Rx transmission(s) 618/619. Such a configuration may save time and improve reliability while the source UE 602 and the network entity 606 negotiate a beam switching procedure after a beam failure condition is detected, but before a beam switching procedure is completed.

Similar to the source UE 502 and the network entity 506 in FIG. 5, the source UE 602 and the network entity 606 may be configured to activate/deactivate the BFR relay configuration in response to detecting a satisfaction of a conditional trigger. For example, the network entity 606 may be configured to activate or deactivate the BFR relay configuration using a MAC CE or DCI transmission (e.g., activate in an Rx transmission of the Tx/Rx transmissions 614, deactivate in an Rx transmission of the Tx/Rx transmissions 522). In response to receiving the activate/deactivate instruction, the source UE 602 may activate/deactivate, respectively, transmitting a BFR using one or more of Tx transmission(s) 616 to the relay UE 604 using the SL channel as opposed to initiating a RACH procedure with the network entity 606 upon detecting a beam failure condition. In another aspect, the source UE 602 may be configured to activate or deactivate the BFR relay configuration using a MAC CE or a UCI transmission (e.g., activate in a Tx transmission of the Tx/Rx transmissions 614, deactivate in a Tx transmission of the Tx/Rx transmissions 622). In response to receiving the activate/deactivate instruction, the network entity 606 may activate/deactivate, respectively, accepting a BFR in one or more of Tx transmission(s) 617 from the relay UE 604 using beam 3 as opposed to responding to a RACH procedure request from the source UE 602. Such activate/deactivate instructions may be transmitted as one of the Tx/Rx transmissions 614 or one of the Tx/Rx transmissions 622.

Figure 7:
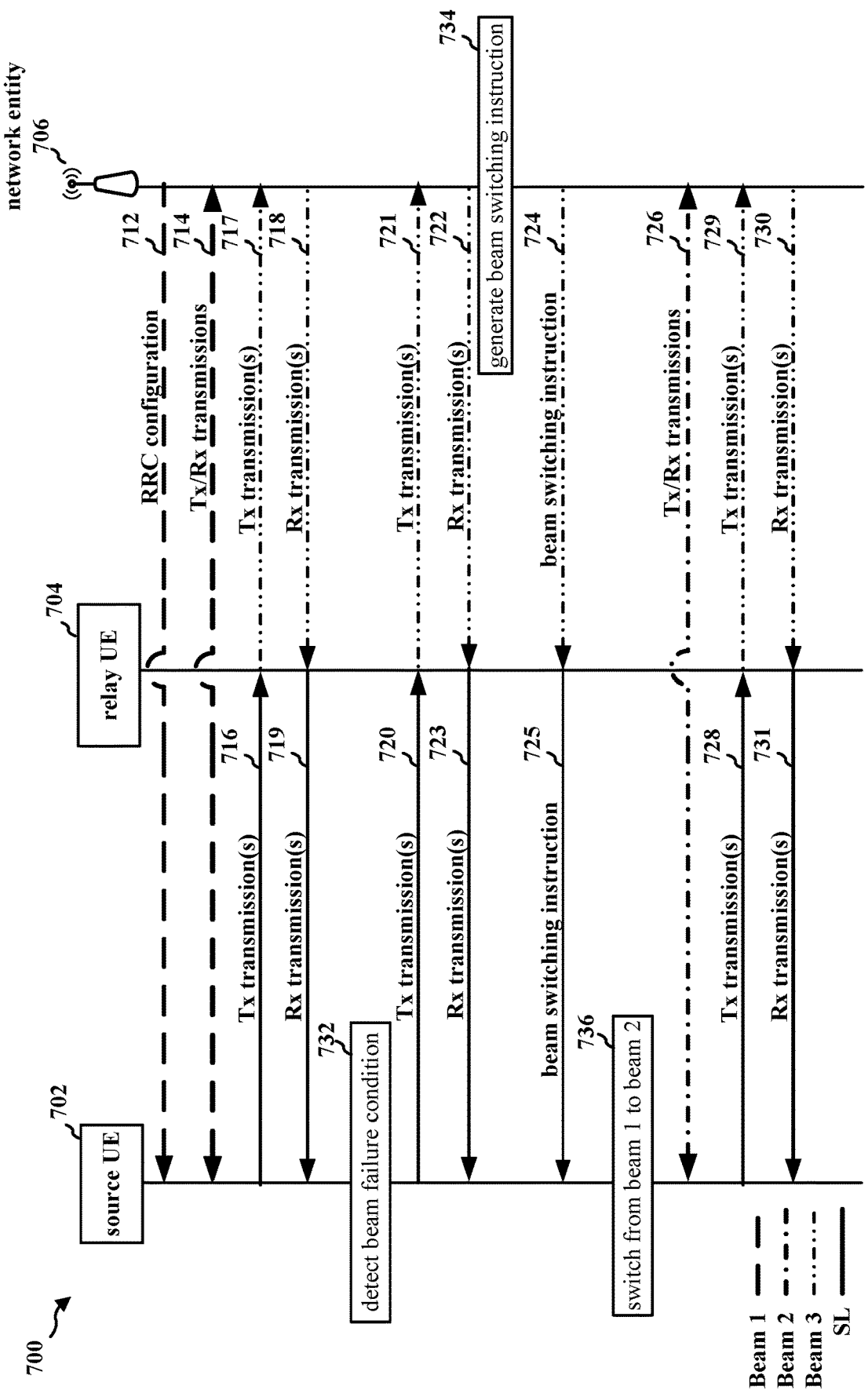
FIG. 7 shows an alternative network connection flow diagram illustrating an example of a source UE configured to conduct a BFR relay configuration with a network entity using a relay UE.

FIG. 7 shows a network connection flow diagram 700 having a source UE 702, a relay UE 704, and a network entity 706, similar to the source UE 602, relay UE 604, and network entity 606 in FIG. 6, respectively. Similarly, the network entity 706 may be configured to transmit an RRC configuration 712 to the source UE 702 using beam 1 to configure the source UE 702, such as BFR content and/or periodicity. Similarly, the source UE 702 may be configured to communicate with the network entity 706 by transmitting and receiving Tx/Rx transmissions 714 using beam 1.

The source UE 702 may be configured to transmit one or more transmit Tx transmission(s) 716 via the relay UE 704 using the SL channel to be forwarded as one or more Tx transmission(s) 717 to the network entity 706 using beam 3, and the network entity 706 may be configured to transmit Rx transmission(s) 718 via the relay UE 704 using beam 3 to be forwarded to the source UE 702 as Rx transmission(s) 719 using the SL channel. Such transmissions may be ones related to the BFR relay configuration. In other words, the source UE 702 and the network entity 706 may be configured to transmit data related to the BFR relay configuration via the relay UE 704. For example, the source UE 702 may be configured to periodically transmit BFR as one or more Tx transmission(s) 716 to the relay UE 704 using the SL channel, and the relay UE 704 may be configured to forward the BFR as one or more of the Tx transmission(s) 717 to the network entity 706 using beam 3. In another aspect, the source UE 702 may be configured to transmit an activation/deactivation instruction as one or more of the Tx transmission(s) 716 to the relay UE 704 using the SL channel, and the relay UE 704 may be configured to forward the activation/deactivation instruction as one or more of the Tx transmission(s) 717 to the network entity 706 using beam 3. The source UE 702 may transmit the activation/deactivation instruction in response to detecting a BFR activation/deactivation condition based on a detected condition of the source UE 702, such as a battery power, storage capacity, or a UE capability of the source UE 702. In response to receiving an activation instruction, the network entity 706 may be configured to transmit an RRC configuration 712 using beam 1 to activate a relay BFR configuration, to transmit a DCI or MAC CE using beam 1 to select a relay BFR configuration from an RRC configuration 712 as one or more Tx/Rx transmissions 714, or to transmit an RRC configuration, a DCI, or MAC CE using beam 3 as one or more of the Rx transmission(s) 718 addressed to the source UE 702 as a target destination to activate/select a relay BFR configuration. In another aspect, the network entity 706 may be configured to transmit an activation/deactivation instruction addressed to the source UE 702 as one or more of the Rx transmission(s) to the relay UE 704 using beam 3, and in response the relay UE 704 may be configured to forward the activation/deactivation instruction as one or more of the Rx transmission(s) 719 to the source UE 702 using the SL channel. In another aspect, the source UE 702 may transmit periodic updated BFRs (or a BFR status, or a change in a BFR metric since the last BFR was transmitted) as one or more Tx transmission(s) 716 addressed to network entity 706 as a target destination in accordance with a configuration loaded using the RRC configuration 712. In another aspect, the network entity 706 may transmit an activation/deactivation condition as one or more Rx transmission(s) 718 addressed to the source UE 702 as a target destination in response to detecting a satisfied conditional trigger. In other words, the source UE 702 may be configured to transmit an activation/deactivation instruction addressed to the network entity 706 as a target destination to the relay UE 704 as one of the Tx transmission(s) 716, and the network entity 706 may be configured to transmit an activation/deactivation instruction addressed to the source UE 702 as a target destination to the relay UE 704 as one of the Rx transmission(s) 718.

Similar to 632 in FIG. 6, at 732, the source UE 702 may detect an occurrence of a beam failure condition for a failed downlink transmission received from the network entity 706 using beam 1 in an Rx transmission of the Tx/Rx transmissions 714. Moreover, in response to detecting the beam failure condition at 732, the source UE 702 may be similarly configured to transmit data to the network entity 706 and receive data from network entity 706 using the relay UE 704 during the beam switching procedure. In other words, the source UE 702 may be configured to transmit one or more Tx transmission(s) 720 to the relay UE 704 using the SL channel, and the relay UE 704 may be configured to forward that one or more Tx transmission(s) 721 to the network entity 706 using beam 3. Likewise, the network entity 706 may be configured to transmit one or more of the Rx transmission(s) 722 to the relay UE 604 using beam 3, and the relay UE 604 may be configured to forward the one or more Rx transmission(s) 723 to the source UE 702 using the SL channel.

Similar to 634 in FIG. 6, at 734, in response to the network entity 706 receiving a BFR via one of Tx transmission(s) 721 from the relay UE 704 using beam 3, the network entity 706 may generate a beam switching instruction 724 for the source UE 702. The network entity 706 may be configured to transmit the beam switching instruction 724 using beam 3 to the relay UE 704, and the relay UE 704 may be configured to forward the beam switching instruction 725 to the source UE 702.

Similar to 636 in FIG. 6, at 736 the source UE 702 may perform a beam switching procedure to switch from using beam 1 to beam 2. The source UE 702 may be similarly configured to communicate with the network entity 706 by transmitting and receiving Tx/Rx transmissions 726 using beam 2.

The source UE 702 and the network entity 706 may be configured to transmit data related to the BFR relay configuration via the relay UE 704 after the source UE 702 switches to transmitting and receiving Tx/Rx transmissions 726 using beam 2 with the network entity 706. For example, the source UE 702 may be configured to periodically transmit updated BFR as one or more Tx transmission(s) 728 to the relay UE 704 using the SL channel, and the relay UE 704 may be configured to forward the BFR as one or more of the Tx transmission(s) 729 to the network entity 706 using beam 3. In another aspect, the source UE 702 may be configured to transmit an activation/deactivation instruction as one or more of the Tx transmission(s) 728 to the relay UE 704 using the SL channel, and the relay UE 704 may be configured to forward the activation/deactivation instruction as one or more of the Tx transmission(s) 729 to the network entity 706 using beam 3. In another aspect, the network entity 706 may be configured to transmit an activation/deactivation instruction as one or more of the Rx transmission(s) 730 to the relay UE 704 using beam 3, and the relay UE 704 may be configured to forward the activation/deactivation instruction as one or more of the Rx transmission(s) 731 to the source UE 702 using the SL channel. In other words, the source UE 702 and the network entity 706 may be configured to transmit data related to the BFR relay configuration via the relay UE 704 even after the source UE 702 switches to transmitting and receiving Tx/Rx transmissions 726 using beam 2 with the network entity 706.

Figure 8:
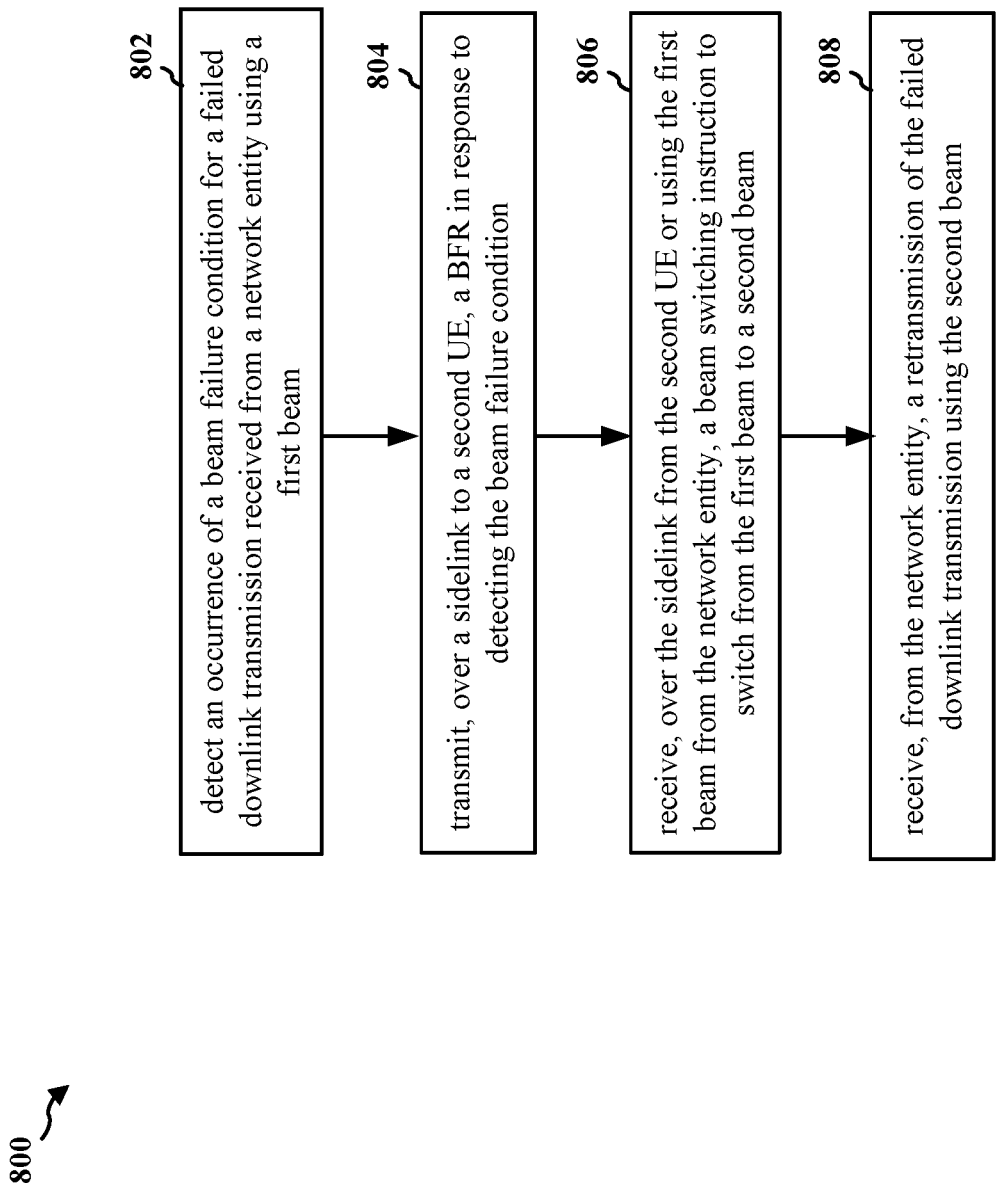
FIG. 8 is a flowchart of a method of wireless communication.

FIG. 8 is a flowchart 800 of a method of wireless communication. The method may be performed by a UE (e.g., the UE 104; the UE 450, the source UE 502, the relay UE 504, source UE 602, the relay UE 604, the source UE 702, the relay UE 704, the apparatus 2304).

At 802, the UE may detect an occurrence of a beam failure condition for a failed downlink transmission received from a network entity using a first beam. For example, the source UE 502 in FIG. 5 may detect an occurrence of a beam failure condition for a failed downlink transmission of the Tx/Rx transmissions 514 received from the network entity 506 using beam 1. Further, 802 may be performed by the BFR beam switching component 198 in FIG. 23.

At 804, the UE may transmit, over a sidelink to a second UE, a BFR in response to detecting the beam failure condition. For example, the source UE 502 in FIG. 5 may transmit, over a SL channel to the relay UE 504, a BFR 516 in response to detecting the beam failure condition on beam 1 at 532. Further, 804 may be performed by the BFR beam switching component 198 in FIG. 23.

At 806, the UE may receive, over the sidelink from the second UE or using the first beam from the network entity, a beam switching instruction to switch from the first beam to a second beam. For example, the source UE 602 in FIG. 6 may receive, over the SL channel from the relay UE 604, a beam switching instruction 621 to switch from beam 1 to beam 2. In another aspect, the source UE 502 in FIG. 5, may receive, from the network entity 506 using beam 1, a beam switching instruction 520 to switch from beam 1 to beam 2. Further, 806 may be performed by the BFR beam switching component 198 in FIG. 23.

At 808, the UE may receive, from the network entity, a retransmission of the failed downlink transmission using the second beam. For example, the source UE 502 in FIG. 5 may receive, from the network entity 506, a retransmission as an Rx transmission of the Tx/Rx transmissions 522 of the failed downlink transmission of the Tx/Rx transmissions 514 using beam 2. Further, 808 may be performed by the BFR beam switching component 198 in FIG. 23.

Figure 9:
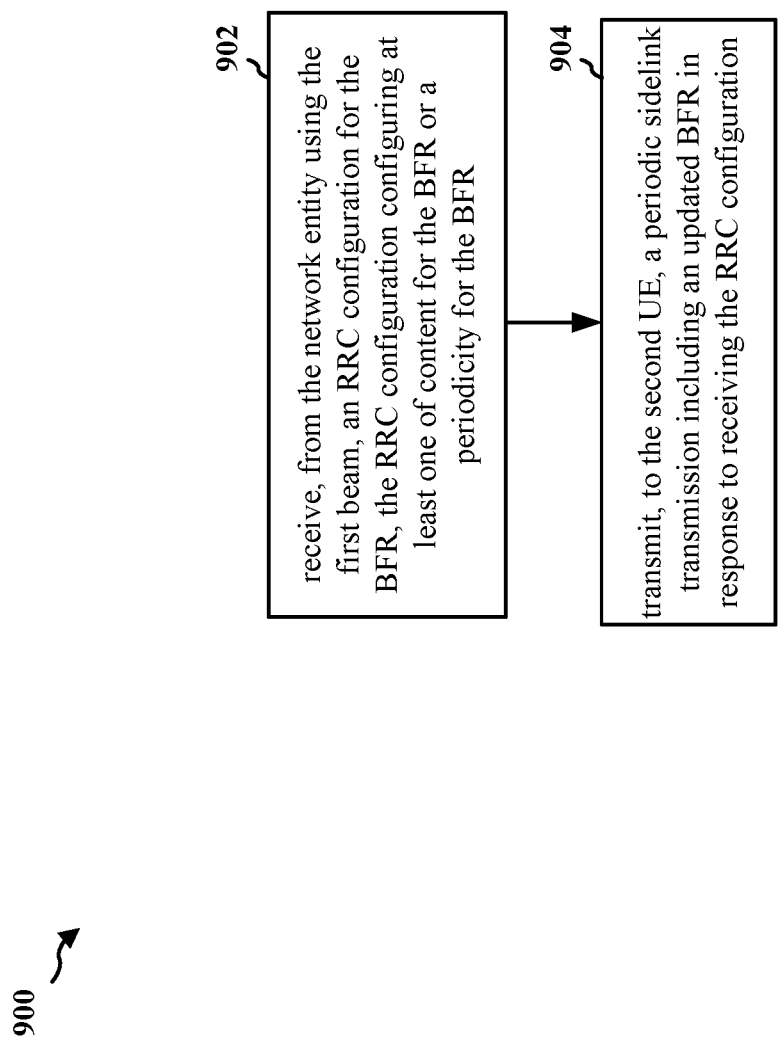
FIG. 9 is another flowchart of a method of wireless communication.

FIG. 9 is a flowchart 900 of a method of wireless communication. The method may be performed by a UE (e.g., the UE 104; the UE 450, the source UE 502, the source UE 602, the source UE 702, the relay UE 704, the apparatus 2304).

At 902, the UE may receive, from the network entity using the first beam, an RRC configuration for the BFR, the RRC configuration configuring at least one of content for the BFR or a periodicity for the BFR. For example, the source UE 702 in FIG. 7 may receive, from the network entity 706 using beam 1, an RRC configuration 712 for the BFR. The RRC configuration 712 may be used by the source UE 702 to configure at least one of content for the BFR or a periodicity for the BFR. Further, 902 may be performed by the BFR beam switching component 198 in FIG. 1 and FIG. 23.

At 904, the UE may transmit, to the second UE, a periodic sidelink transmission including an updated BFR in response to receiving the RRC configuration. For example, the source UE 702 in FIG. 7 may transmit, to the relay UE 704, a periodic sidelink transmission as a Tx transmission of Tx transmission(s) 716 including an updated BFR in response to receiving the RRC configuration 712 from the network entity 706. Further, 802 may be performed by the BFR beam switching component 198 in FIG. 1 and FIG. 23.

Figure 10:
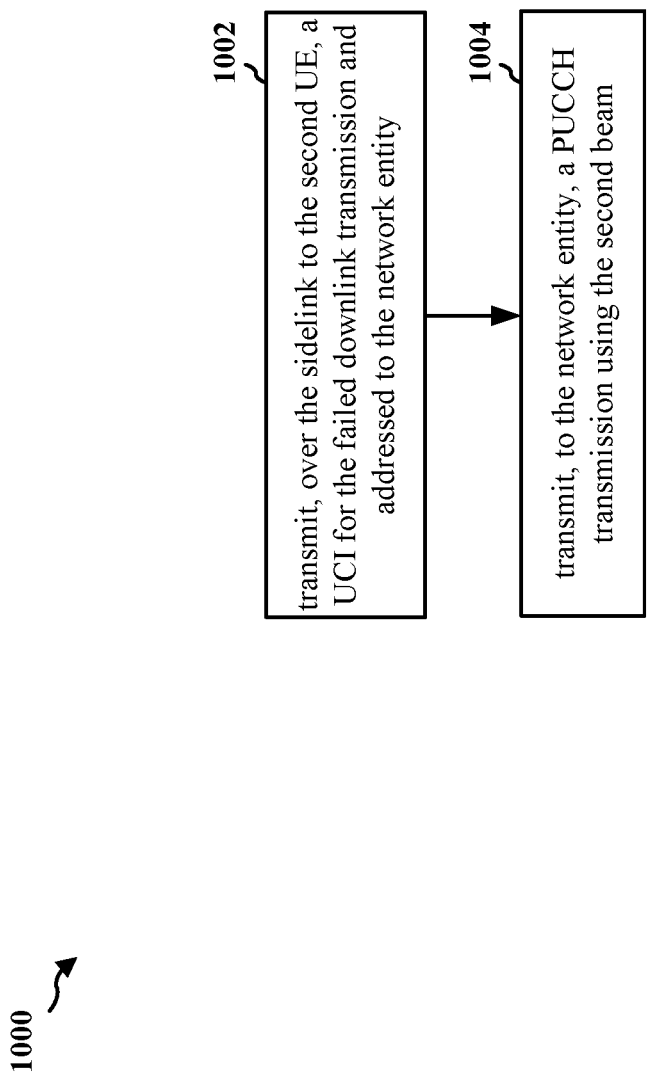
FIG. 10 is another flowchart of a method of wireless communication.

FIG. 10 is a flowchart 1000 of a method of wireless communication. The method may be performed by a UE (e.g., the UE 104; the UE 450, the source UE 502, the source UE 602, the source UE 702, the relay UE 704, the apparatus 2304).

At 1002, the UE may transmit, over the sidelink to the second UE, a UCI for the failed downlink transmission and addressed to the network entity. For example, the source UE 602 in FIG. 6 may transmit, over the SL channel to the relay UE 604, a UCI for the failed downlink transmission of the Tx/Rx transmissions 614 and addressed to the network entity 606. Further, 1002 may be performed by the BFR beam switching component 198 in FIG. 1 and FIG. 23.

At 1004, the UE may transmit, to the network entity, a PUCCH transmission using the second beam. For example, the source UE 602 in FIG. 6 may transmit, to the network entity 606, a PUCCH transmission as one of the Tx/Rx transmissions 622 using beam 2. Further, 1004 may be performed by the BFR beam switching component 198 in FIG. 1 and FIG. 23.

Figure 11:
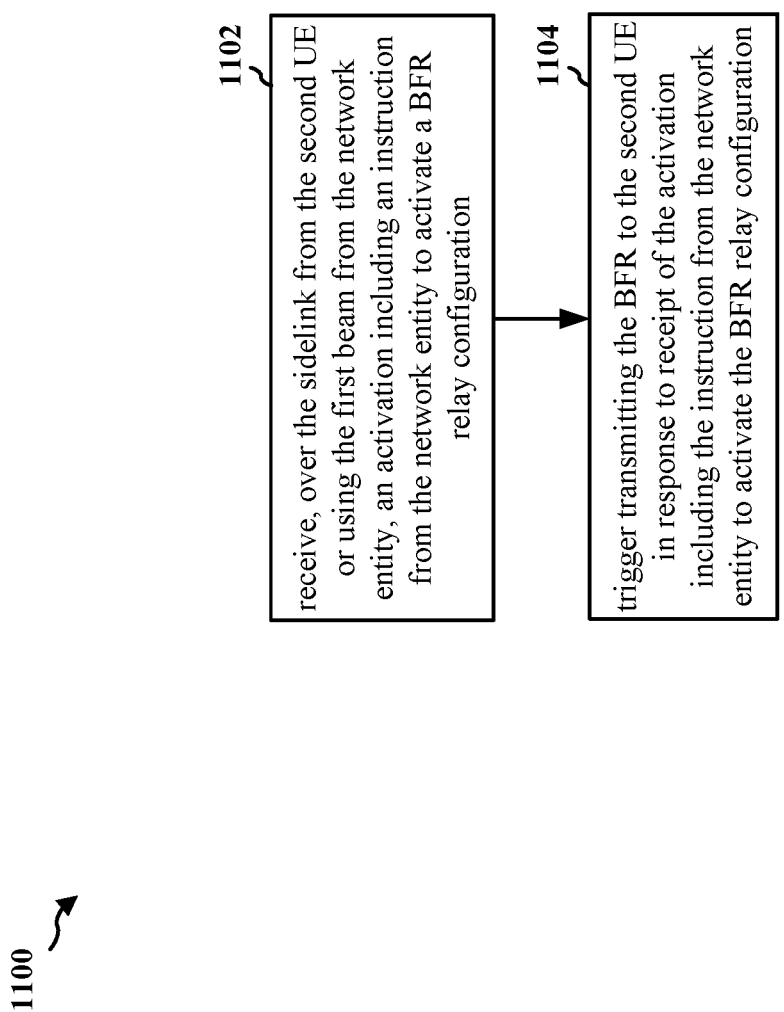
FIG. 11 is another flowchart of a method of wireless communication.

FIG. 11 is a flowchart 1100 of a method of wireless communication. The method may be performed by a UE (e.g., the UE 104; the UE 450, the source UE 502, the source UE 602, the source UE 702, the relay UE 704, the apparatus 2304).

At 1102, the UE may receive, over the sidelink from the second UE or using the first beam from the network entity, an activation including an instruction from the network entity to activate a BFR relay configuration. For example, the source UE 702 in FIG. 7 may receive, over the SL channel from the relay UE 704, an activation as one of the Rx transmission(s) 719 including an instruction from the network entity 706 to activate a BFR relay configuration. In another aspect, the source UE 602 in FIG. 6 may receive, from the network entity 606 via beam 1, an activation as one of the Tx/Rx transmissions 614 including an instruction from the network entity 606 to activate a BFR relay configuration. Further, 1102 may be performed by the BFR beam switching component 198 in FIG. 1 and FIG. 23.

At 1104, the UE may trigger transmitting the BFR to the second UE in response to receipt of the activation including the instruction from the network entity to activate the BFR relay configuration. For example, the source UE 702 in FIG. 7 may trigger transmitting the BFR as a one of the Tx transmission(s) 720 to the relay UE 704 in response to receipt of the activation as one of the Rx transmission(s) 719 including the instruction from the network entity 706 to activate the BFR relay configuration. Further, 1104 may be performed by the BFR beam switching component 198 in FIG. 1 and FIG. 23.

Figure 12:
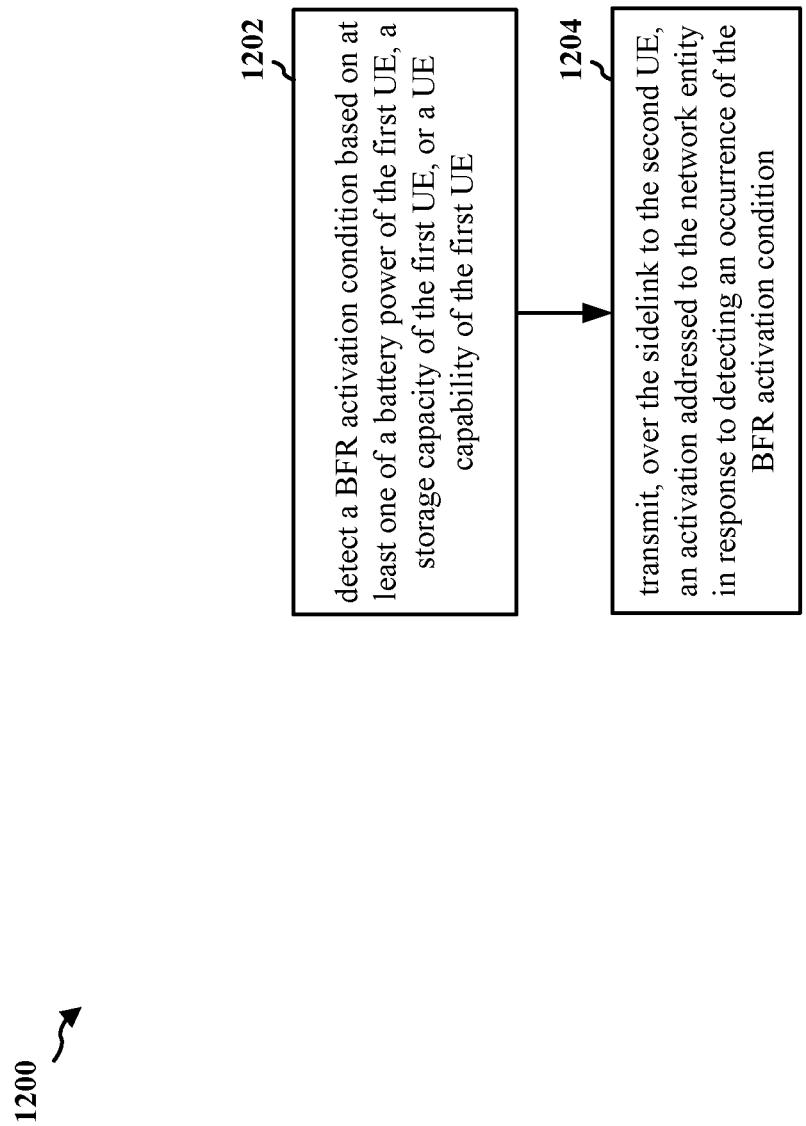
FIG. 12 is another flowchart of a method of wireless communication.

FIG. 12 is a flowchart 1200 of a method of wireless communication. The method may be performed by a UE (e.g., the UE 104; the UE 450, the source UE 502, the source UE 602, the source UE 702, the relay UE 704, the apparatus 2304).

At 1202, the UE may detect a BFR activation condition based on at least one of a battery power of the first UE, a storage capacity of the first UE, or a UE capability of the first UE. For example, the source UE 702 in FIG. 7 may detect a BFR activation condition based on at least one of a battery power of the source UE 702, a storage capacity of the source UE 702, or a UE capability of the source UE 702. Further, 1202 may be performed by the BFR beam switching component 198 in FIG. 1 and FIG. 23.

At 1204, the UE may transmit, over the sidelink to the second UE, an activation addressed to the network entity in response to detecting an occurrence of the BFR activation condition. For example, the source UE 702 in FIG. 7 may transmit, over the SL channel to the relay UE 704, an activation as one or more of the Tx transmission(s) 716 addressed to the network entity 706 in response to detecting an occurrence of the BFR activation condition. Further, 1204 may be performed by the BFR beam switching component 198 in FIG. 1 and FIG. 23.

Figure 13:
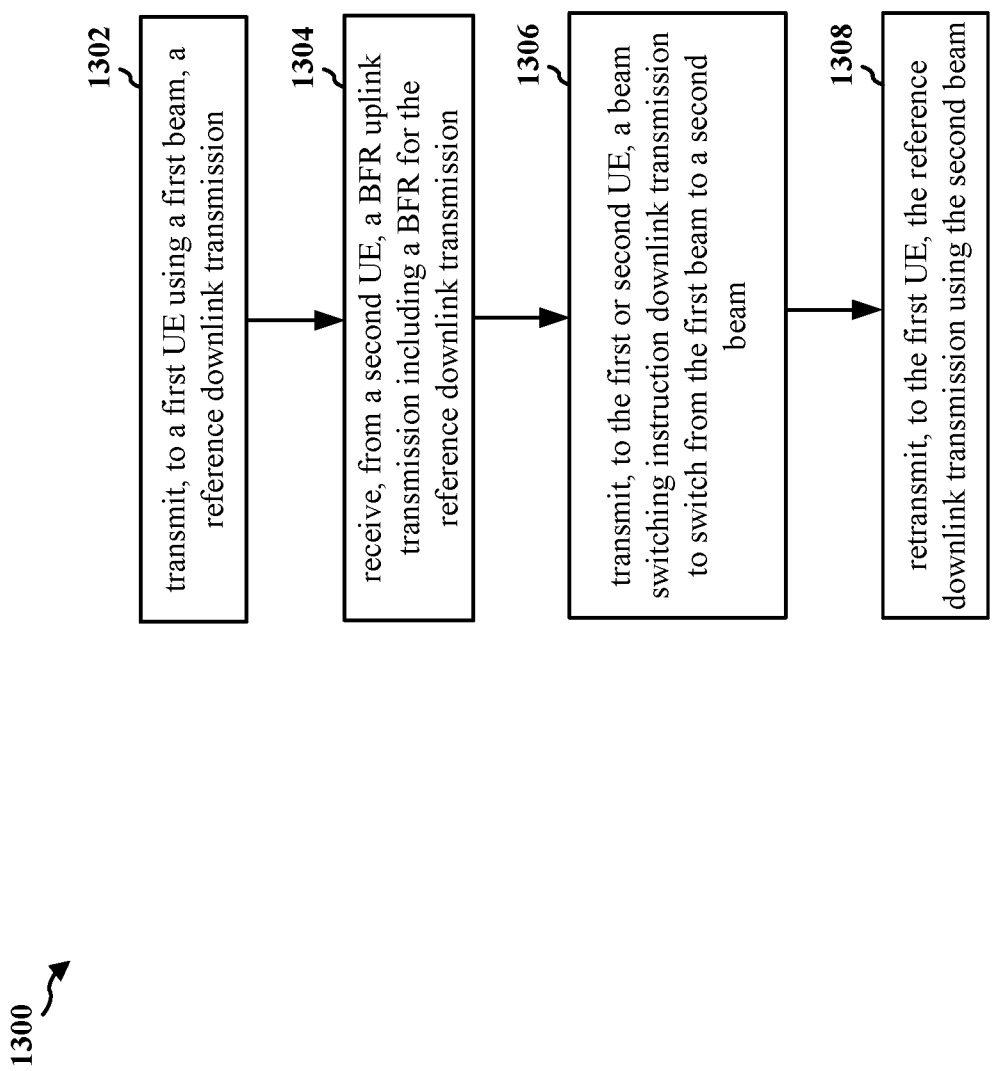
FIG. 13 is another flowchart of a method of wireless communication.

FIG. 13 is a flowchart 1300 of a method of wireless communication. The method may be performed by a network entity (e.g., the base station 102; the base station 410, the network entity 506, the network entity 606, the network entity 706, the network entity 2302).

At 1302, the network entity may transmit, to a first UE using a first beam, a reference downlink transmission. For example, the network entity 506 in FIG. 5 may transmit, to the source UE 502 using beam 1, a reference downlink transmission of the Tx/Rx transmissions 514. Further, 1302 may be performed by the BFR beam switcher component 199 in FIG. 1 and FIG. 23.

At 1304, the network entity may receive, from a second UE, a BFR uplink transmission including a BFR for the reference downlink transmission. For example, the network entity 506 in FIG. 5 may receive, from the relay UE 504, a BFR uplink transmission including a BFR 517 for the reference downlink transmission of the Tx/Rx transmissions 514. Further, 1304 may be performed by the BFR beam switcher component 199 in FIG. 1 and FIG. 23.

At 1306, the network entity may transmit, to the first or second UE, a beam switching instruction downlink transmission to switch from the first beam to a second beam. For example, the network entity 506 in FIG. 5 may transmit, to the source UE 502, a beam switching instruction downlink transmission having a beam switching instruction 520 to switch from beam 1 to beam 2. In another aspect, the network entity 606 in FIG. 6 may transmit, to the source UE 602, a beam switching instruction downlink transmission having a beam switching instruction 620 to switch from beam 1 to beam 2. Further, 1306 may be performed by the BFR beam switcher component 199 in FIG. 1 and FIG. 23.

At 1308, the network entity may retransmit, to the first UE, the reference downlink transmission using the second beam. For example, the network entity 506 in FIG. 5 may retransmit, to the source UE 502, the reference downlink transmission of the Rx transmission of the Tx/Rx transmissions 514 as an Rx transmission of Tx/Rx transmissions 522 using beam 2. Further, 1308 may be performed by the BFR beam switcher component 199 in FIG. 1 and FIG. 23.

Figure 14:
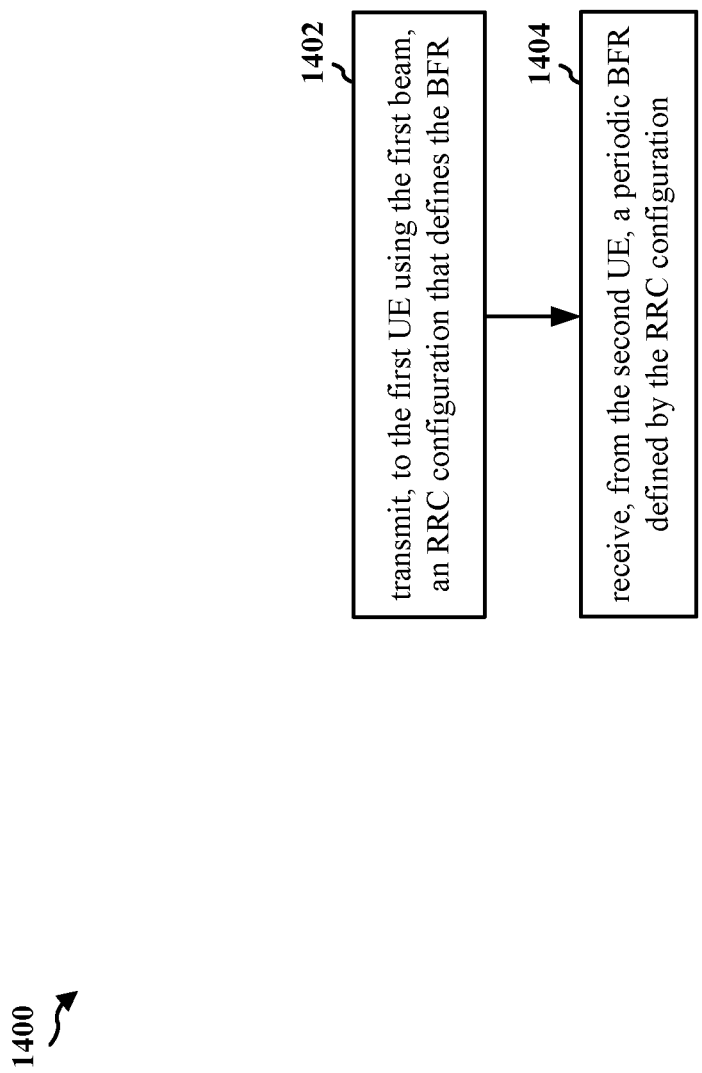
FIG. 14 is another flowchart of a method of wireless communication.

FIG. 14 is a flowchart 1400 of a method of wireless communication. The method may be performed by a network entity (e.g., the base station 102; the base station 410, the network entity 506, the network entity 606, the network entity 706, the network entity 2302).

At 1402, the network entity may transmit, to the first UE using the first beam, an RRC configuration that defines the BFR. For example, the network entity 706 in FIG. 7 may transmit, to the source UE 702 using beam 1, an RRC configuration 712 that defines the BFR. Further, 1402 may be performed by the BFR beam switcher component 199 in FIG. 1 and FIG. 23.

At 1404, the network entity may receive, from the second UE, a periodic BFR defined by the RRC configuration. For example, the network entity 706 in FIG. 7 may receive, from the relay UE 704, a periodic BFR as one or more Tx transmission(s) 717 defined by the RRC configuration 712. Further, 1404 may be performed by the BFR beam switcher component 199 in FIG. 1 and FIG. 23.

Figure 15:
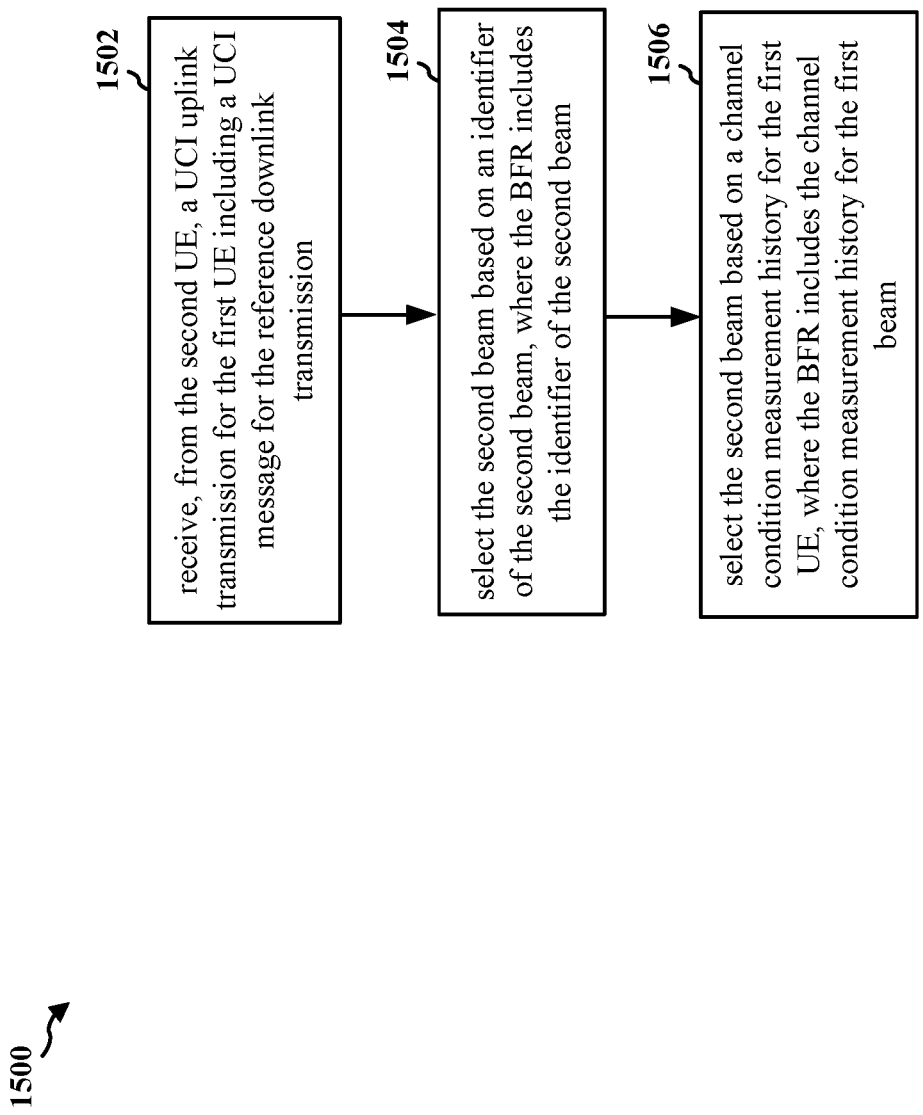
FIG. 15 is another flowchart of a method of wireless communication.

FIG. 15 is a flowchart 1500 of a method of wireless communication. The method may be performed by a network entity (e.g., the base station 102; the base station 410, the network entity 506, the network entity 606, the network entity 706, the network entity 2302).

At 1502, the network entity may receive, from the second UE, a UCI uplink transmission for the first UE including a UCI message for the reference downlink transmission. For example, the network entity 606 in FIG. 6 may receive, from the relay UE 604, a UCI uplink transmission as one of the Tx transmission(s) 617 for the source UE 602 including a UCI message for the reference downlink transmission of the Tx/Rx transmissions 614. Further, 1502 may be performed by the BFR beam switcher component 199 in FIG. 1 and FIG. 23.

At 1504, the network entity may select the second beam based on an identifier of the second beam, where the BFR includes the identifier of the second beam. For example, the network entity 606 in FIG. 6 may select beam 2 based on an identifier of the second beam, where the BFR transmitted as one of the Tx/Rx transmission(s) 617 may include the identifier of beam 2. Further, 1504 may be performed by the BFR beam switcher component 199 in FIG. 1 and FIG. 23.

At 1506, the network entity may select the second beam based on a channel condition measurement history for the first UE, where the BFR includes the channel condition measurement history for the first beam. For example, the network entity 606 in FIG. 6 may select beam 2 based on a channel condition measurement history for source UE 602, where the BFR includes the channel condition measurement history for beam 1. Further, 1506 may be performed by the BFR beam switcher component 199 in FIG. 1 and FIG. 23.

Figure 16:
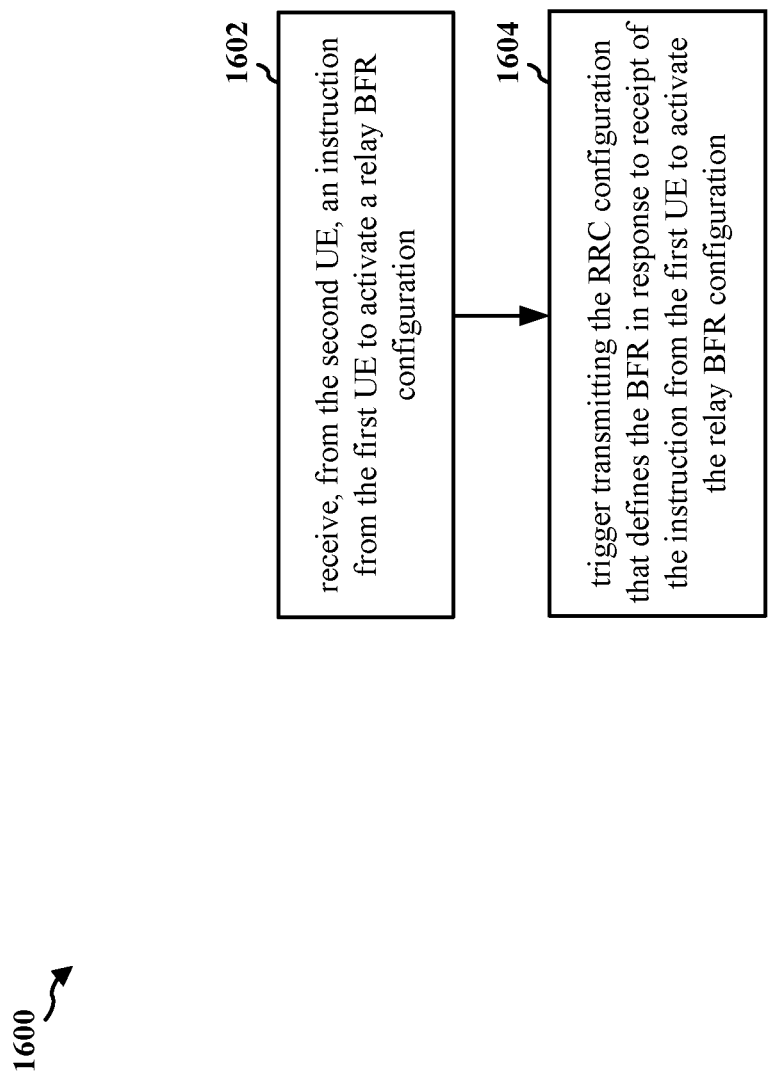
FIG. 16 is another flowchart of a method of wireless communication.

FIG. 16 is a flowchart 1600 of a method of wireless communication. The method may be performed by a network entity (e.g., the base station 102; the base station 410, the network entity 506, the network entity 606, the network entity 706, the network entity 2302).

At 1602, the network entity may receive, from the second UE, an instruction from the first UE to activate a relay BFR configuration. For example, the network entity 706 in FIG. 7 may receive, from the relay UE 704, an instruction as one of the Tx transmission(s) 717 from the source UE 702 to activate a relay BFR configuration. Further, 1602 may be performed by the BFR beam switcher component 199 in FIG. 1 and FIG. 23.

At 1604, the network entity may trigger transmitting the RRC configuration that defines the BFR in response to receipt of the instruction from the first UE to activate the relay BFR configuration. For example, the network entity 706 in FIG. 7 may trigger transmitting the RRC configuration 712 that defines the BFR in response to receipt of the instruction from the source UE 702 as one of the Tx transmission(s) 717 to activate the relay BFR configuration. Further, 1604 may be performed by the BFR beam switcher component 199 in FIG. 1 and FIG. 23.

Figure 17:
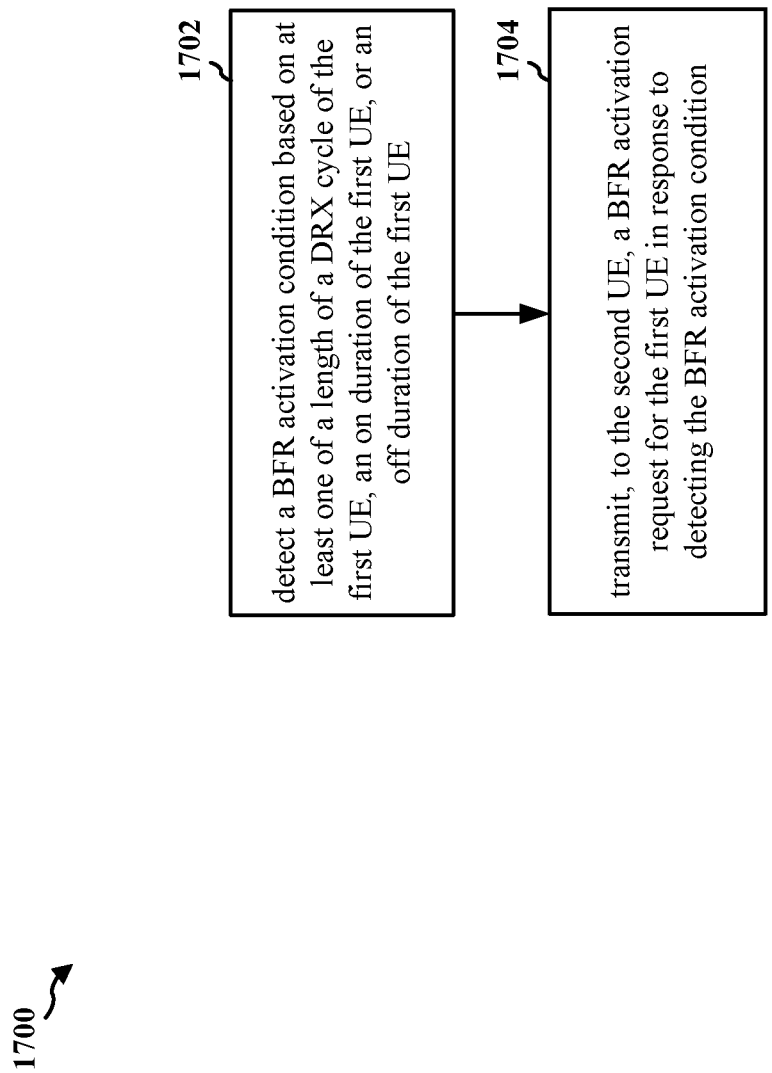
FIG. 17 is another flowchart of a method of wireless communication.

FIG. 17 is a flowchart 1700 of a method of wireless communication. The method may be performed by a network entity (e.g., the base station 102; the base station 410, the network entity 506, the network entity 606, the network entity 706, the network entity 2302).

At 1702, the network entity may detect a BFR activation condition based on at least one of a length of a DRX cycle of the first UE, an on duration of the first UE, or an off duration of the first UE. For example, the network entity 706 in FIG. 7 may detect a BFR activation condition based on at least one of a length of a DRX cycle of the source UE 702, an on duration of the source UE 702, or an off duration of the source UE 702. Further, 1702 may be performed by the BFR beam switcher component 199 in FIG. 1 and FIG. 23.

At 1704, the network entity may transmit, to the second UE, a BFR activation request for the first UE in response to detecting the BFR activation condition. For example, the network entity 706 in FIG. 7 may transmit, to the relay UE 704, a BFR activation request as one or more of the Rx transmission(s) 718 addressed to the source UE 702 in response to detecting the BFR activation condition. Further, 1704 may be performed by the BFR beam switcher component 199 in FIG. 1 and FIG. 23.

Figure 18:
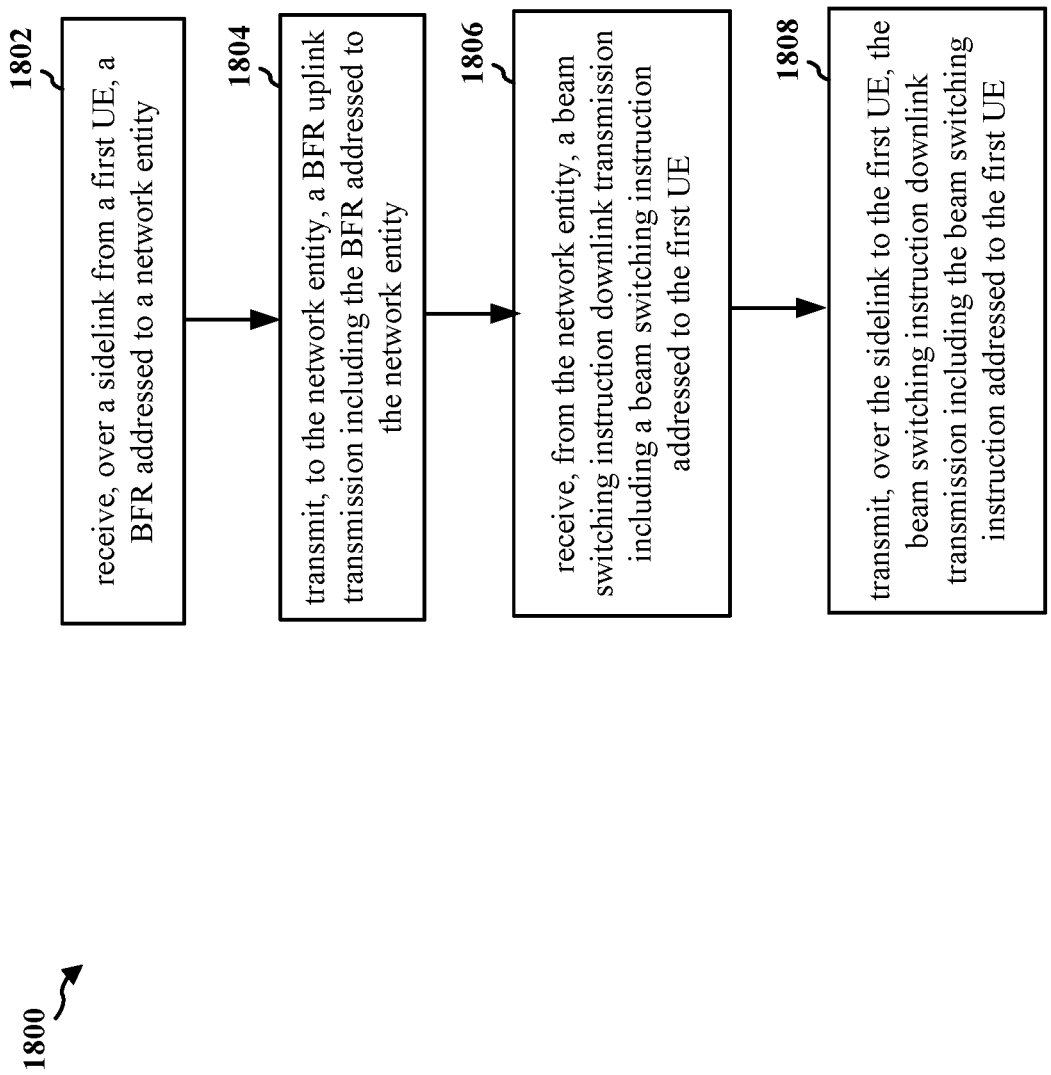
FIG. 18 is another flowchart of a method of wireless communication.

FIG. 18 is a flowchart 1800 of a method of wireless communication. The method may be performed by a UE (e.g., the UE 104; the UE 450, the relay UE 504, the relay UE 604, the relay UE 704, the apparatus 2304).

At 1802, the UE may receive, over a sidelink from a first UE, a BFR addressed to a network entity. For example, the relay UE 604 in FIG. 6 may receive, over the SL channel from source UE 602, a BFR as one or more of the Tx transmission(s) 616 addressed to the network entity 606. Further, 1802 may be performed by the BFR relay component 197 in FIG. 1 and FIG. 23.

At 1804, the UE may transmit, to the network entity, a BFR uplink transmission including the BFR addressed to the network entity. For example, the relay UE 604 in FIG. 6 may transmit, to the network entity 606, a BFR uplink transmission as one or more of the Tx transmission(s) 617 including the BFR addressed to the network entity 606. Further, 1804 may be performed by the BFR relay component 197 in FIG. 1 and FIG. 23.

At 1806, the UE may receive, from the network entity, a beam switching instruction downlink transmission including a beam switching instruction addressed to the first UE. For example, the relay UE 704 in FIG. 7 may receive, from the network entity 706, a beam switching instruction downlink transmission as including a beam switching instruction 724 addressed to the source UE 702. Further, 1806 may be performed by the BFR relay component 197 in FIG. 1 and FIG. 23.

At 1808, the UE may transmit, over the sidelink to the first UE, the beam switching instruction including the beam switching instruction addressed to the first UE. For example, the relay UE 704 in FIG. 7 may transmit, over the SL channel to the source UE 702, the beam switching instruction downlink transmission including the beam switching instruction 725 addressed to the source UE 702. Further, 1808 may be performed by the BFR relay component 197 in FIG. 1 and FIG. 23.

Figure 19:
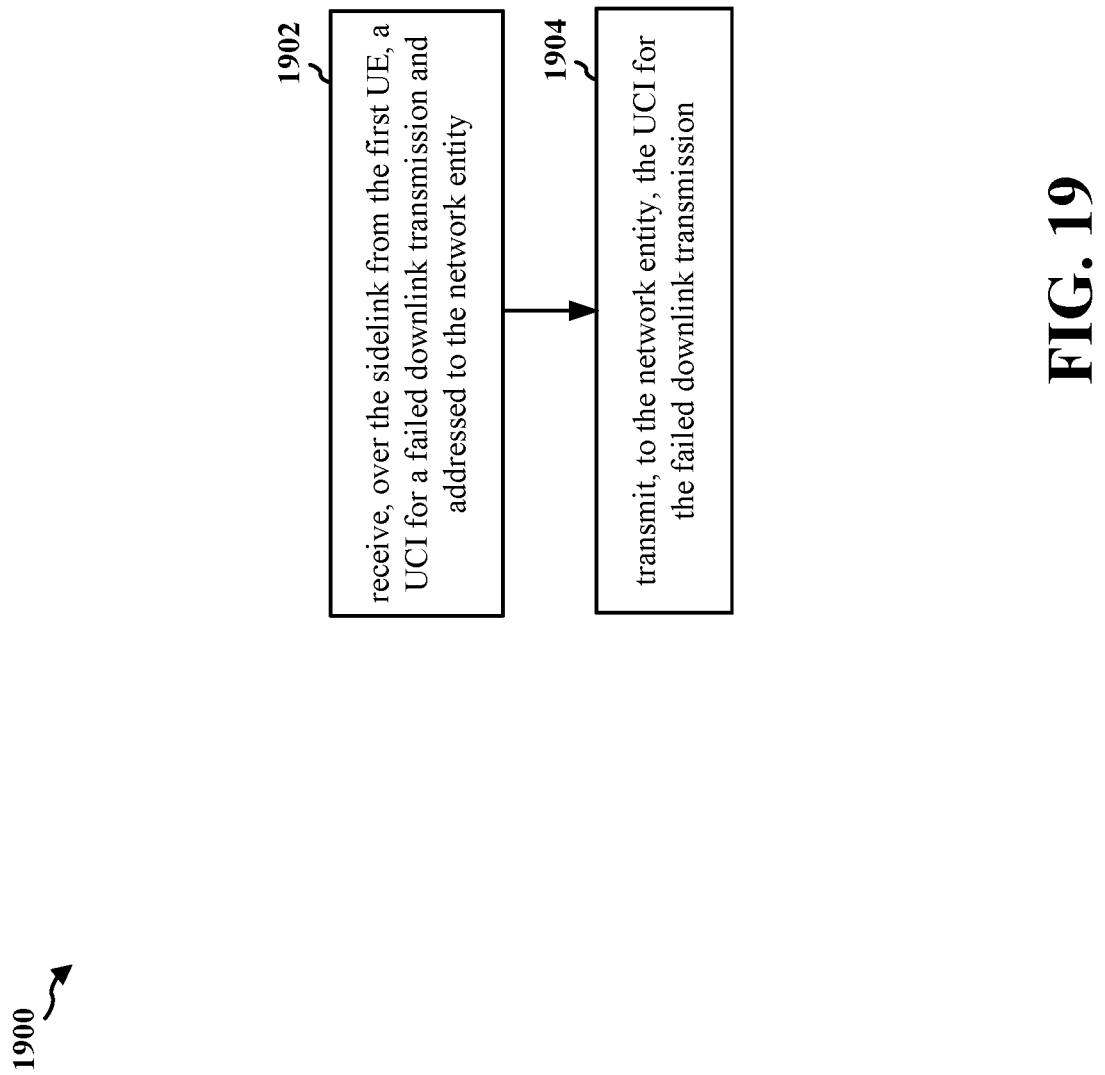
FIG. 19 is another flowchart of a method of wireless communication.

FIG. 19 is a flowchart 1900 of a method of wireless communication. The method may be performed by a UE (e.g., the UE 104; the UE 450, the relay UE 504, the relay UE 604, the relay UE 704, the apparatus 2304).

At 1902, the UE may receive, over the sidelink from the first UE, a UCI for a failed downlink transmission and addressed to the network entity. For example, the relay UE 604 in FIG. 6 may receive, over the SL channel from the source UE 602, a UCI as one or more of the Tx transmission(s) 616 and addressed to the network entity 606. Further, 1902 may be performed by the BFR relay component 197 in FIG. 1 and FIG. 23.

At 1904, the UE may transmit, to the network entity, the UCI for the failed downlink transmission. For example, the relay UE 604 in FIG. 6 may transmit, to the network entity 606, the UCI for the failed downlink transmission as one or more of the Tx transmission(s) 617. Further, 1904 may be performed by the BFR relay component 197 in FIG. 1 and FIG. 23.

Figure 20:
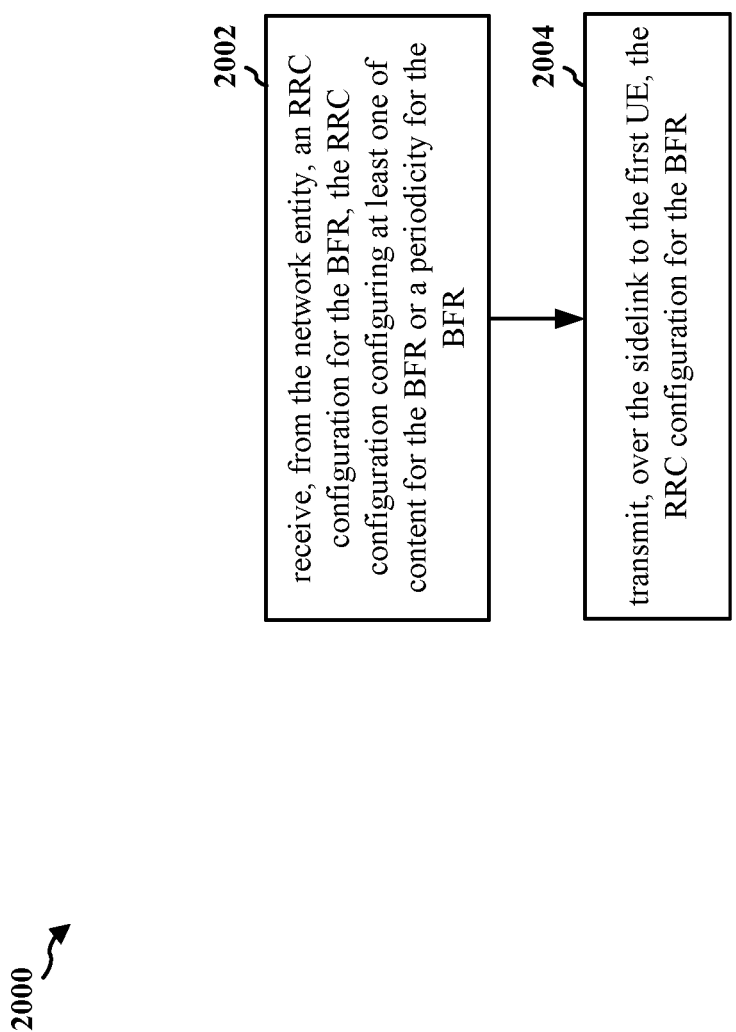
FIG. 20 is another flowchart of a method of wireless communication.

FIG. 20 is a flowchart 2000 of a method of wireless communication. The method may be performed by a UE (e.g., the UE 104; the UE 450, the relay UE 504, the relay UE 604, the relay UE 704, the apparatus 2304).

At 2002, the UE may receive, from the network entity, an RRC configuration for the BFR, the RRC configuration configuring at least one of content for the BFR or a periodicity for the BFR. For example, the relay UE 704 in FIG. 7 may receive, from the network entity 706, an RRC configuration for the BFR as one or more of the Rx transmission(s) 718. The RRC configuration may configure at least one of content for the BFR or a periodicity for the BFR. Further, 2002 may be performed by the BFR relay component 197 in FIG. 1 and FIG. 23.

At 2004, the UE may transmit, over the sidelink to the first UE, the RRC configuration for the BFR. For example, the relay UE 704 in FIG. 7 may transmit, over the SL channel to the source UE 702, the RRC configuration for the BFR as one or more Rx transmission(s) 719. Further, 2004 may be performed by the BFR relay component 197 in FIG. 1 and FIG. 23.

Figure 21:
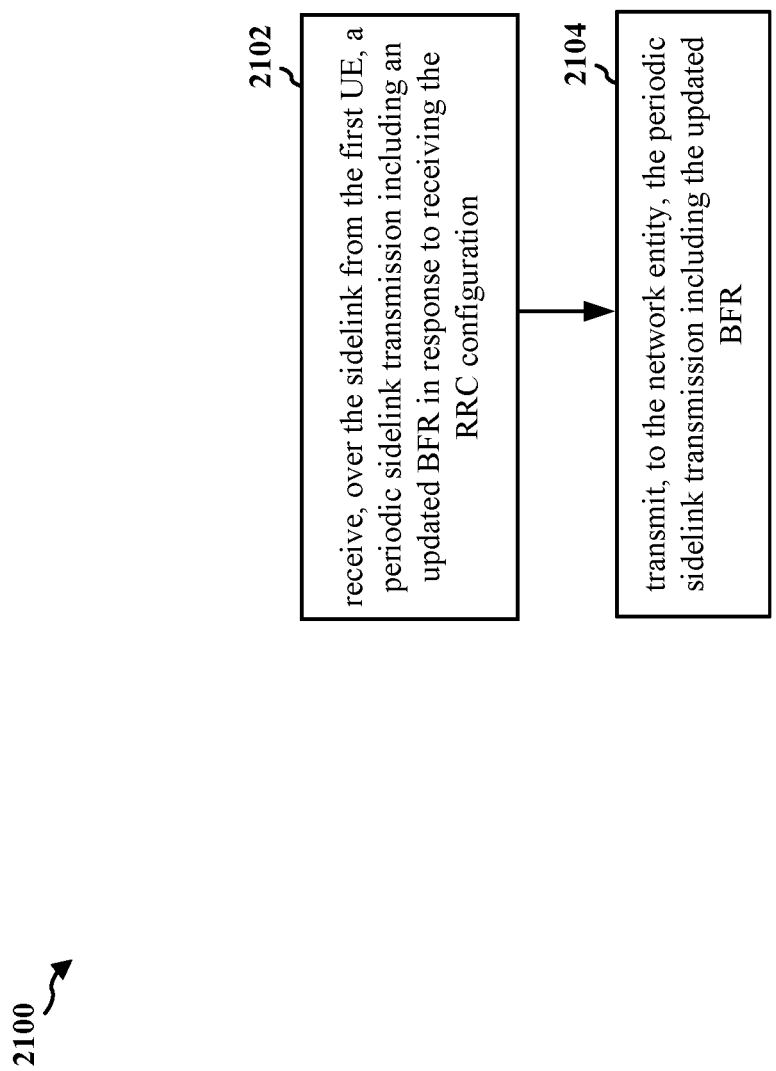
FIG. 21 is another flowchart of a method of wireless communication.

FIG. 21 is a flowchart 2100 of a method of wireless communication. The method may be performed by a UE (e.g., the UE 104; the UE 450, the relay UE 504, the relay UE 604, the relay UE 704, the apparatus 2304).

At 2102, the UE may receive, over the sidelink from the first UE, a periodic sidelink transmission including an updated BFR in response to receiving the RRC configuration. For example, the relay UE 704 in FIG. 7 may receive, over the SL channel from the source UE 702, a periodic sidelink transmission including an updated BFR as one or more of the Tx transmission(s) 716 using the SL channel in response to receiving the RRC configuration 712. Further, 2102 may be performed by the BFR relay component 197 in FIG. 1 and FIG. 23.

At 2104, the UE may transmit, to the network entity, the periodic sidelink transmission including the updated BFR. For example, the relay UE 704 in FIG. 7 may transmit, to the network entity 706, the periodic sidelink transmission including the updated BFR as one or more of the Tx transmission(s) 717. Further, 2104 may be performed by the BFR relay component 197 in FIG. 1 and FIG. 23.

Figure 22:
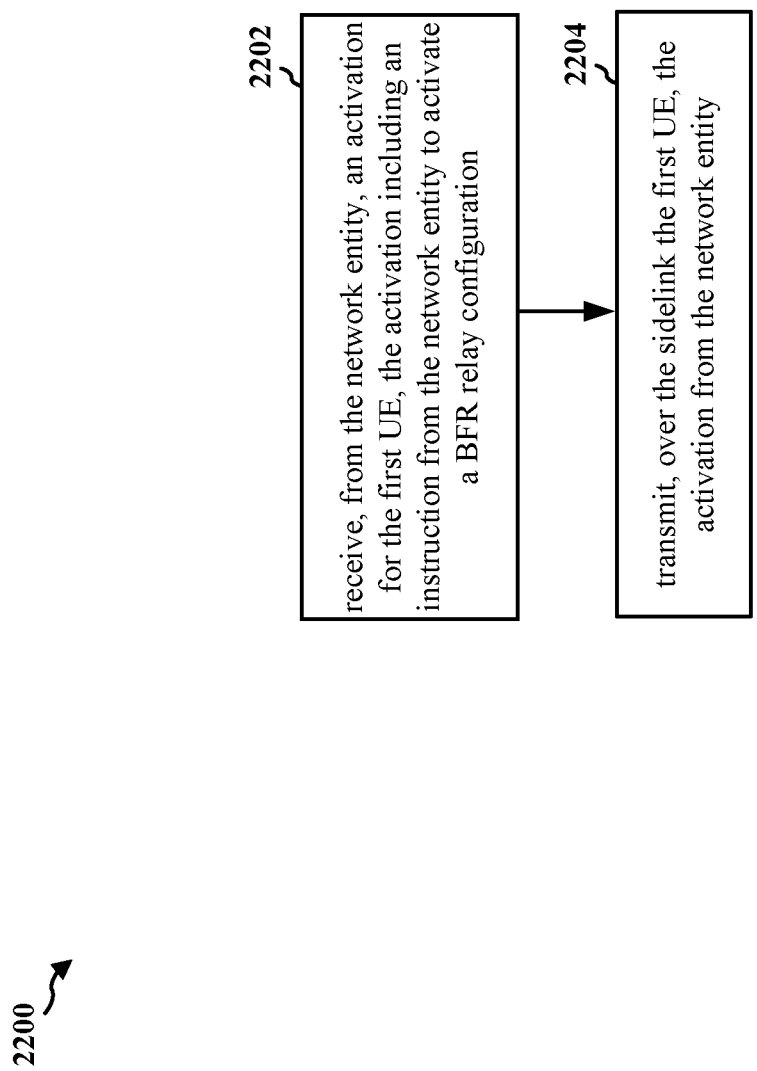
FIG. 22 is another flowchart of a method of wireless communication.

FIG. 22 is a flowchart 2200 of a method of wireless communication. The method may be performed by a UE (e.g., the UE 104; the UE 450, the relay UE 504, the relay UE 604, the relay UE 704, the apparatus 2304).

At 2202, the UE may receive, from the network entity, an activation for the first UE, the activation including an instruction from the network entity to activate a BFR relay configuration. For example, the relay UE 704 in FIG. 7 may receive, from the network entity 706, an activation as one or more of the Rx transmission(s) 718 for the source UE 702, the activation may include an instruction from the network entity 706 to activate a BFR relay configuration. Further, 2202 may be performed by the BFR relay component 197 in FIG. 1 and FIG. 23.

At 2204, the UE may transmit, over the sidelink the first UE, the activation from the network entity. For example, the relay UE 704 in FIG. 7 may transmit, over the SL channel to the source UE 702, the activation as one or more of the Rx transmission(s) 719 from the network entity 706. Further, 2204 may be performed by the BFR relay component 197 in FIG. 1 and FIG. 23.

Figure 23:
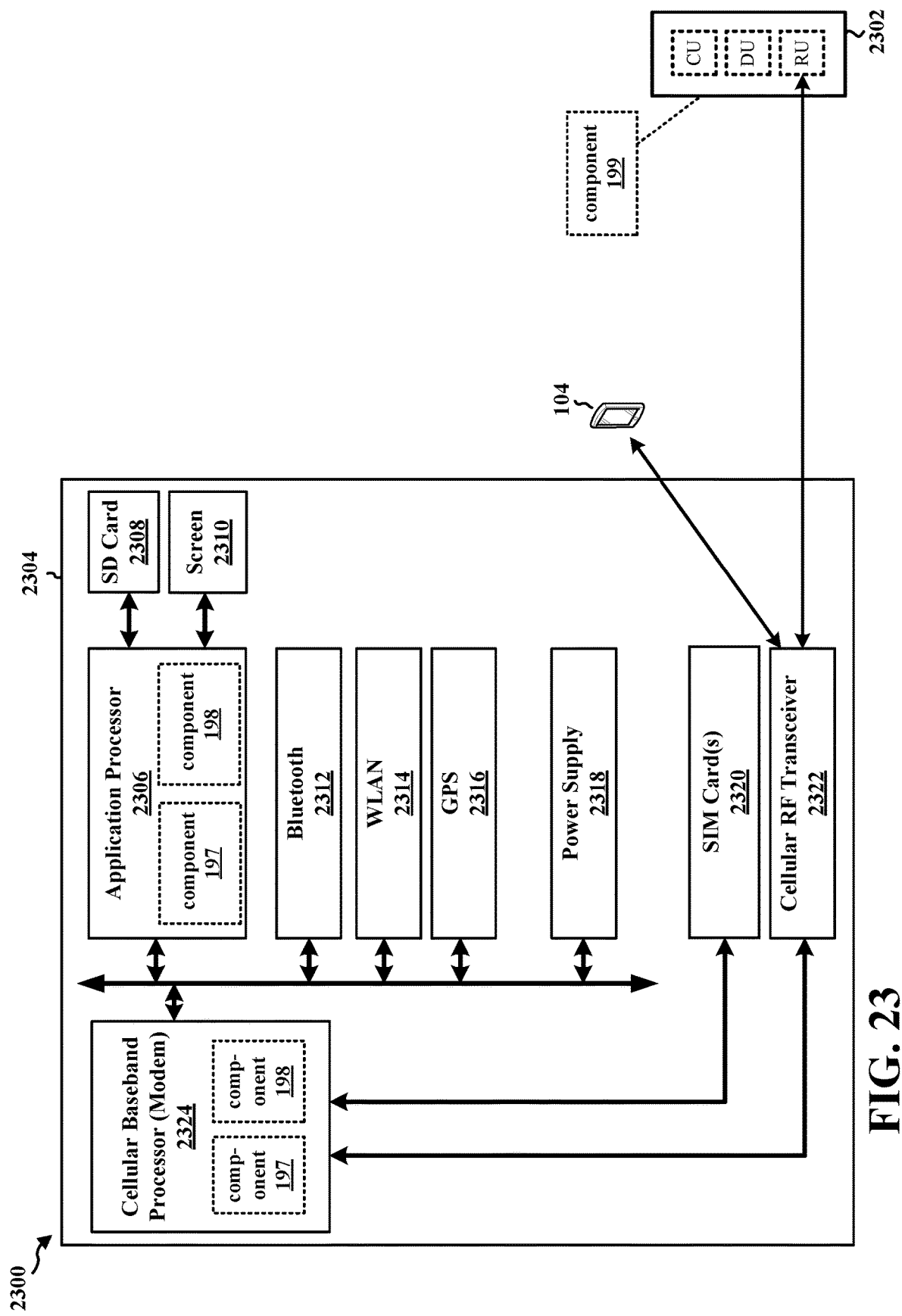
FIG. 23 is a diagram illustrating an example of a hardware implementation for an example apparatus.

FIG. 23 is a diagram 2300 illustrating an example of a hardware implementation for an apparatus 2304 and a network entity 2302. The apparatus 2304 may be a UE, a component of a UE, or may implement UE functionality. The network entity 2302 may be a BS, a component of a BS, or may implement BS functionality. In some aspects, the apparatus 2304 may include a cellular baseband processor 2324 (also referred to as a modem) coupled to a cellular RF transceiver 2322. In some aspects, the apparatus 2304 may further include one or more subscriber identity modules (SIM) cards 2320, an application processor 2306 coupled to a secure digital (SD) card 2308 and a screen 2310, a Bluetooth module 2312, a wireless local area network (WLAN) module 2314, a Global Positioning System (GPS) module 2316, or a power supply 2318. The cellular baseband processor 2324 communicates through the cellular RF transceiver 2322 with the UE 104 and/or with an RU associated with the network entity 2302. The RU is either part of the network entity 2302 or is in communication with the network entity 2302. The network entity 2302 may include one or more of the CU, DU, and the RU. The cellular baseband processor 2324 and the application processor 2306 may each include a computer-readable medium/memory. Each computer-readable medium/memory may be non-transitory. The cellular baseband processor 2324 and the application processor 2306 are each responsible for general processing, including the execution of software stored on the computer-readable medium/memory. The software, when executed by the cellular baseband processor 2324/application processor 2306, causes the cellular baseband processor 2324/application processor 2306 to perform the various functions described supra. The computer-readable medium/memory may also be used for storing data that is manipulated by the cellular baseband processor 2324/application processor 2306 when executing software. The cellular baseband processor 2324/application processor 2306 may be a component of the UE 450 and may include the memory 460 and/or at least one of the Tx processor 468, the Rx processor 456, and the controller/processor 459. In one configuration, the apparatus 2304 may be a processor chip (modem and/or application) and include just the cellular baseband processor 2324 and/or the application processor 2306, and in another configuration, the apparatus 2304 may be the entire UE (e.g., see UE 450 of FIG. 4) and include the additional modules of the apparatus 2304.

As discussed supra, the component 198 may be configured to detect an occurrence of a beam failure condition for a failed downlink transmission received from a network entity using a first beam. The component 198 may transmit, over a sidelink to a second UE, a BFR in response to detecting the beam failure condition. The component 198 may receive, over the sidelink from the second UE or from the network entity, a beam switching instruction to switch from the first beam to a second beam. The component 198 may receive, from the network entity, a retransmission of the failed downlink transmission using the second beam. The component 198 may be within the cellular baseband processor 2324, the application processor 2306, or both the cellular baseband processor 2324 and the application processor 2306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2304 may include a variety of components configured for various functions. In one configuration, the apparatus 2304, and in particular the cellular baseband processor 2324 and/or the application processor 2306, includes means for detecting an occurrence of a beam failure condition for a failed downlink transmission received from a network entity using a first beam, means for transmitting, over a sidelink to a second UE, a BFR in response to detecting the beam failure condition, means for receiving, over the sidelink from the second UE or using the first beam from the network entity, a beam switching instruction to switch from the first beam to a second beam, means for receiving, from the network entity, a retransmission of the failed downlink transmission using the second beam, means for receiving, from the network entity using the first beam, an RRC configuration for the BFR, the RRC configuration configuring at least one of content for the BFR or a periodicity for the BFR, means for transmitting, to the second UE, a periodic sidelink transmission including an updated BFR in response to receiving the RRC configuration, means for transmitting, over the sidelink to the second UE, a UCI for the failed downlink transmission and addressed to the network entity, means for transmitting, to the network entity, a PUCCH transmission using the second beam, means for receiving, over the sidelink from the second UE or using the first beam from the network entity, an activation including an instruction from the network entity to activate a BFR relay configuration, means for triggering transmitting the BFR to the second UE in response to receipt of the activation including the instruction from the network entity to activate the BFR relay configuration, means for detecting a BFR activation condition based on at least one of a battery power of the first UE, a storage capacity of the first UE, or a UE capability of the first UE, and means for transmitting, over the sidelink to the second UE, an activation addressed to the network entity in response to detecting an occurrence of the BFR activation condition. The means may be the component 198 of the apparatus 2304 configured to perform the functions recited by the means. As described supra, the apparatus 2304 may include the Tx processor 468, the Rx processor 456, and the controller/processor 459. As such, in one configuration, the means may be the Tx processor 468, the Rx processor 456, and/or the controller/processor 459 configured to perform the functions recited by the means.

As discussed supra, the BFR beam switcher component 199 may be configured to transmit, to a first UE using a first beam, a reference downlink transmission. The BFR beam switcher component 199 may be further configured to receive, from a second UE, a BFR uplink transmission including a BFR for the reference downlink transmission. The BFR beam switcher component 199 may be further configured to transmit, to the first or second UE, a beam switching instruction downlink transmission to switch from the first beam to a second beam. The BFR beam switcher component 199 may be further configured to retransmit, to the first UE, the reference downlink transmission using the second beam. The component 199 may be within one or more processors (e.g., BBU(s)) of one or more of the CU, DU, and the RU. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2302 may include a variety of components configured for various functions. In one configuration, the network entity 2302 includes means for transmitting, to a first UE using a first beam, a reference downlink transmission, means for receiving, from a second UE, a BFR uplink transmission including a BFR for the reference downlink transmission, means for transmitting, to the first or second UE, a beam switching instruction downlink transmission to switch from the first beam to a second beam, means for retransmitting, to the first UE, the reference downlink transmission using the second beam, means for transmitting, to the first UE using the first beam, an RRC configuration that defines the BFR, means for receiving, from the second UE, a periodic BFR defined by the RRC configuration, means for receiving, from the second UE, a UCI uplink transmission for the first UE including a UCI message for the reference downlink transmission, means for selecting the second beam based on an identifier of the second beam, where the BFR includes the identifier of the second beam, means for selecting the second beam based on a channel condition measurement history for the first UE, where the BFR includes the channel condition measurement history for the first beam, means for receiving, from the second UE, an instruction from the first UE to activate a relay BFR configuration, means for triggering transmitting the RRC configuration that defines the BFR in response to receipt of the instruction from the first UE to activate the relay BFR configuration, means for detecting a BFR activation condition based on at least one of a length of a DRX cycle of the first UE, an on duration of the first UE, or an off duration of the first UE, and means for transmitting, to the second UE, a BFR activation request for the first UE in response to detecting the BFR activation condition. The means may be the component 199 of the network entity 2302 configured to perform the functions recited by the means. As described supra, the network entity 2302 may include the Tx processor 416, the Rx processor 470, and the controller/processor 475. As such, in one configuration, the means may be the Tx processor 416, the Rx processor 470, and/or the controller/processor 475 configured to perform the functions recited by the means.

As discussed supra, the component 197 may be configured to receive, over a sidelink from a first UE, a BFR addressed to a network entity. The component 197 may transmit, to the network entity, a BFR uplink transmission comprising the BFR addressed to the network entity. The component 197 may receive, from the network entity, a beam switching instruction downlink transmission comprising a beam switching instruction addressed to the first UE. The component 197 may transmit, over the sidelink to the first UE, the beam switching instruction comprising the beam switching instruction addressed to the first UE. The component 197 may be within the cellular baseband processor 2324, the application processor 2306, or both the cellular baseband processor 2324 and the application processor 2306. The component 197 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2304 may include a variety of components configured for various functions. In one configuration, the apparatus 2304, and in particular the cellular baseband processor 2324 and/or the application processor 2306, includes means for receiving, over a sidelink from a first UE, a BFR addressed to a network entity, means for transmitting, to the network entity, a BFR uplink transmission including the BFR addressed to the network entity, means for receiving, from the network entity, a beam switching instruction downlink transmission including a beam switching instruction addressed to the first UE, means for transmitting, over the sidelink to the first UE, the beam switching instruction downlink transmission including the beam switching instruction addressed to the first UE, means for receiving, over the sidelink from the first UE, a UCI for a failed downlink transmission and addressed to the network entity, means for transmitting, to the network entity, the UCI for the failed downlink transmission, means for receiving, from the network entity, an RRC configuration for the BFR, the RRC configuration configuring at least one of content for the BFR or a periodicity for the BFR, means for transmitting, over the sidelink to the first UE, the RRC configuration for the BFR, means for receiving, over the sidelink from the first UE, a periodic sidelink transmission including an updated BFR in response to receiving the RRC configuration, means for transmitting, to the network entity, the periodic sidelink transmission including the updated BFR, means for receiving, from the network entity, an activation for the first UE, the activation including an instruction from the network entity to activate a BFR relay configuration, and means for transmitting, over the sidelink the first UE, the activation from the network entity. The means may be the component 197 of the apparatus 2304 configured to perform the functions recited by the means. As described supra, the apparatus 2304 may include the Tx processor 468, the Rx processor 456, and the controller/processor 459. As such, in one configuration, the means may be the Tx processor 468, the Rx processor 456, and/or the controller/processor 459 configured to perform the functions recited by the means.

While FIG. 23 shows each an apparatus 2304 including both a BFR relay component 197 and a BFR beam switching component 198, an apparatus 2304 may be configured to have a BFR relay component 197 without having a BFR beam switching component 198, or may be configured to have a BFR beam switching component 198 without having a BFR relay component 197. For example, the source UE 502 in FIG. 5 may be configured as an apparatus 2304 having a BFR beam switching component 198 without having a BFR relay component 197 and the relay UE 504 in FIG. 5 may be configured as an apparatus 2304 having a BFR relay component 197 without having a BFR beam switching component 198.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method of wireless communication at a first UE, including detecting an occurrence of a beam failure condition for a failed downlink transmission received from a network entity using a first beam. The method may further include transmitting, over a sidelink to a second UE, a BFR in response to detecting the beam failure condition. The method may further include receiving, over the sidelink from the second UE, a beam switching instruction to switch from the first beam to a second beam. The method may further include receiving, from the network entity, a retransmission of the failed downlink transmission using the second beam.

Aspect 2 is the method of aspect 1, further including transmitting, over the sidelink to the second UE, an UCI for the failed downlink transmission and addressed to the network entity.

Aspect 3 is the method of any of aspects 1 and 2, where the network entity may include a MAC layer and a first radio unit. The BFR may identify the MAC layer of the network entity as a target destination.

Aspect 4 is the method of any of aspects 1 to 3, where the beam switching instruction may include at least one of a DCI or a MAC CE.

Aspect 5 is the method of any of aspects 1 to 4, further including transmitting, to the network entity, a PUCCH transmission using the second beam.

Aspect 6 is the method of any of aspects 1 to 5, where the BFR may have one or more of (1) a BFR MAC CE having a UE indicated beam switching instruction, (2) an identifier of the second beam, or (3) a channel condition measurement history for the first UE.

Aspect 7 is the method of any of aspects 1 to 4, further including receiving, from the network entity using the first beam, an RRC configuration for the BFR. The RRC configuration may configure at least one of content for the BFR or a periodicity for the BFR.

Aspect 8 is the method of aspect 7, further including transmitting, to the second UE, a periodic sidelink transmission including an updated BFR in response to receiving the RRC configuration.

Aspect 9 is the method of any of aspects 1 to 4, further including receiving, over the sidelink from the second UE, an activation including an instruction from the network entity to activate a BFR relay configuration. Transmitting the BFR to the second UE may be triggered in response to the receiving the activation having the instruction from the network entity to activate the BFR relay configuration.

Aspect 10 is the method of any of aspects 1 to 4, further including detecting a BFR activation condition based on at least one of a battery power of the first UE, a storage capacity of the first UE, or a UE capability of the first UE. The method may further include transmitting, over the sidelink to the second UE, an activation addressed to the network entity in response to detecting an occurrence of the BFR activation condition.

Aspect 11 is a method of wireless communication at a network entity, including transmitting, to a first UE using a first beam, a reference downlink transmission. The method may further include receiving, from a second UE, a BFR uplink transmission including a BFR for the reference downlink transmission. The method may further include transmitting, to the second UE, a beam switching instruction downlink transmission to switch from the first beam to a second beam. The method may further include retransmitting, to the first UE, the reference downlink transmission using the second beam.

Aspect 12 is the method of aspect 11, further including receiving, from the second UE, a UCI uplink transmission for the first UE including a UCI message for the reference downlink transmission.

Aspect 13 is the method of any of aspects 11 and 12, where the transmitting to the first UE may include transmitting to the first UE using a first RU. The transmitting to the second UE may include transmitting to the second UE using a second RU different from the first RU.

Aspect 14 is the method of any of aspects 11 to 13, where the beam switching instruction downlink transmission may include at least one of a DCI or a MAC CE.

Aspect 15 is the method of any of aspects 11 to 14, further including selecting the second beam based on an identifier of the second beam. The BFR may include the identifier of the second beam.

Aspect 16 is the method of any of aspects 11 to 15, further including selecting the second beam based on a channel condition measurement history for the first UE. The BFR may include the channel condition measurement history for the first beam.

Aspect 17 is the method of any of aspects 11 to 16, further including transmitting, to the first UE using the first beam, an RRC configuration that defines the BFR Aspect 18 is the method of aspect 17, further including receiving, from the second UE, a periodic BFR defined by the RRC configuration.

Aspect 19 is the method of aspect 17, further including receiving, from the second UE, an instruction from the first UE to activate a relay BFR configuration. Transmitting the RRC configuration that defines the BFR may be triggered in response to the receiving the instruction from the first UE to activate the relay BFR configuration.

Aspect 20 is the method of any of aspects 11 to 19, further including detecting a BFR activation condition based on at least one of (1) a length of a DRX cycle of the first UE, (2) an on duration of the first UE, or (3) an off duration of the first UE. The method may further include transmitting, to the second UE, a BFR activation request for the first UE in response to detecting the BFR activation condition.

Aspect 21 is a method of wireless communication at a second UE, including receiving, over a sidelink from a first UE, a BFR addressed to a network entity. The method may also include transmitting, to the network entity, a BFR uplink transmission including the BFR addressed to the network entity. The method may also include receiving, from the network entity, a beam switching instruction downlink transmission including a beam switching instruction addressed to the first UE. The method may also include transmitting, over the sidelink to the first UE, the beam switching instruction including the beam switching instruction addressed to the first UE.

Aspect 22 is the method of aspect 21, further including receiving, over the sidelink from the first UE, a UCI for a failed downlink transmission and addressed to the network entity.

Aspect 23 is the method of any of aspects 21 and 22, where the network entity includes a MAC layer and a first radio unit. Where the BFR from the first UE identifies the MAC layer of the network entity as a target destination.

Aspect 24 is the method of any of aspects 21 to 23, where the beam switching instruction may include at least one of a DCI or a MAC CE.

Aspect 25 is the method of any of aspects 21 to 24, where the BFR from the first UE includes one or more of (1) a BFR MAC CE having a UE indicated beam switching instruction, (2) an identifier of a beam, or (3) a channel condition measurement history for the first UE.

Aspect 26 is the method of any of aspects 21 to 25, further including receiving, from the network entity an RRC configuration for the BFR. The RRC configuration may configure at least one of content for the BFR or a periodicity for the BFR. The method may further include transmitting, over the sidelink to the first UE, the RRC configuration for the BFR.

Aspect 27 is the method of aspect 26, further including receiving, from the first UE, a periodic sidelink transmission including an updated BFR in response to receiving the RRC configuration.

Aspect 28 is the method of any of aspects 21 to 27, further including receiving, from the network entity, an activation for the first UE. The activation may include an instruction from the network entity to activate a BFR relay configuration. The method may further include transmitting, over the sidelink the first UE, the activation from the network entity.

Aspect 29 is an apparatus for wireless communication at a first UE including at least one processor coupled to a memory and configured to implement any of aspects 1 to 10.

Aspect 30 is the apparatus of aspect 29, further including a transceiver.

Aspect 31 is an apparatus for wireless communication at a network entity including at least one processor coupled to a memory and configured to implement any of aspects 11 to 21.

Aspect 32 is the apparatus of aspect 31, further including a transceiver.

Aspect 33 is an apparatus for wireless communication at a second UE including at least one processor coupled to a memory and configured to implement any of aspects 21 to 28.

Aspect 34 is the apparatus of aspect 33, further including a transceiver.

Aspect 35 is an apparatus for wireless communication including means for implementing any of aspects 1 to 28.

Aspect 36 is the apparatus of aspect 35, further including a transceiver.

Aspect 37 is a computer-readable medium storing computer executable code, where the code when executed by a processor causes the processor to implement any of aspects 1 to 28.

What is claimed is:

1. An apparatus for wireless communication at a first user equipment (UE), comprising:
a memory; and
at least one processor coupled to the memory and configured to:
detect an occurrence of a beam failure condition for a failed downlink transmission received from a network entity using a first beam;
transmit, over a sidelink to a second UE, a beam failure report (BFR) in response to detecting the beam failure condition;
receive, over the sidelink from the second UE or using the first beam from the network entity, a beam switching instruction to switch from the first beam to a second beam; and
receive, from the network entity, a retransmission of the failed downlink transmission using the second beam
wherein the at least one processor is further configured to:
receive, over the sidelink from the second UE or using the first beam from the network entity, an activation comprising an instruction from the network entity to activate a BFR relay configuration; or
detect a BFR activation condition based on at least one of a battery power of the first UE, a storage capacity of the first UE, or a UE capability of the first UE.

2. The apparatus of claim 1, wherein the at least one processor is further configured to:
transmit, over the sidelink to the second UE, an uplink control information (UCI) for the failed downlink transmission and addressed to the network entity.

3. The apparatus of claim 1, wherein the network entity comprises a medium access control (MAC) layer and a first radio unit, and wherein the BFR identifies the MAC layer of the network entity as a target destination.

4. The apparatus of claim 1, wherein the beam switching instruction comprises at least one of a downlink control information (DCI) or a MAC control element (MAC CE).

5. The apparatus of claim 1, further comprising a transceiver coupled to the at least one processor, wherein the at least one processor is further configured to:
transmit, to the network entity, a physical uplink control channel (PUCCH) transmission using the second beam.

6. The apparatus of claim 1, wherein the BFR comprises one or more of:
a BFR MAC CE having a UE indicated beam switching instruction,
an identifier of the second beam, or
a channel condition measurement history for the first UE.

7. The apparatus of claim 1, wherein the at least one processor is further configured to:
receive, from the network entity using the first beam, a radio resource control (RRC) configuration for the BFR, the RRC configuration configuring at least one of content for the BFR or a periodicity for the BFR.

8. The apparatus of claim 7, wherein the at least one processor is further configured to:
transmit, to the second UE, a periodic sidelink transmission comprising an updated BFR in response to receiving the RRC configuration.

9. The apparatus of claim 1, wherein the at least one processor is further configured to:
trigger transmitting the BFR to the second UE in response to receipt of the activation comprising the instruction from the network entity to activate the BFR relay configuration.

10. The apparatus of claim 1, wherein the at least one processor is further configured to:
transmit, over the sidelink to the second UE, an activation addressed to the network entity in response to detecting an occurrence of the BFR activation condition.

11. An apparatus for wireless communication at a network entity, comprising:
a memory; and
at least one processor coupled to the memory and configured to:
transmit, to a first user equipment (UE) using a first beam, a reference downlink transmission;

receive, from a second UE, a beam failure report (BFR) uplink transmission comprising a BFR for the reference downlink transmission;

transmit, to the first or the second UE, a beam switching instruction downlink transmission to switch from the first beam to a second beam; and retransmit, to the first UE, the reference downlink transmission using the second beam;

wherein the at least one processor is further configured to:

receive, from the second UE, an instruction from the first UE to activate a relay BFR configuration; or detect a BFR activation condition based on at least one of a length of a discontinuous reception (DRX) cycle of the first UE, an on duration of the first UE, or an off duration of the first UE.

12. The apparatus of claim 11, wherein the at least one processor is further configured to:

receive, from the second UE, an uplink control information (UCI) uplink transmission for the first UE comprising a UCI message for the reference downlink transmission.

13. The apparatus of claim 11, wherein the at least one processor is configured to transmit to the first UE by transmitting to the first UE using a first radio unit (RU), and wherein the at least one processor is configured to transmit to the second UE by transmitting to the second UE using a second RU different from the first RU.

14. The apparatus of claim 11, wherein the beam switching instruction downlink transmission comprises at least one of a downlink control information (DCI) or a MAC control element (MAC CE).

15. The apparatus of claim 11, wherein the at least one processor is further configured to:

select the second beam based on an identifier of the second beam, wherein the BFR comprises the identifier of the second beam.

16. The apparatus of claim 11, wherein the at least one processor is further configured to:

select the second beam based on a channel condition measurement history for the first UE, wherein the BFR comprises the channel condition measurement history for the first beam.

17. The apparatus of claim 11, further comprising a transceiver coupled to the at least one processor, wherein the at least one processor is further configured to:

transmit, to the first UE using the first beam, a radio resource control (RRC) configuration that defines the BFR.

18. The apparatus of claim 17, wherein the at least one processor is further configured to:

receive, from the second UE, a periodic BFR defined by the RRC configuration.

19. The apparatus of claim 17, wherein the at least one processor is further configured to:

trigger transmitting the RRC configuration that defines the BFR in response to receipt of the instruction from the first UE to activate the relay BFR configuration.

20. The apparatus of claim 11, wherein the at least one processor is further configured to:

transmit, to the second UE, a BFR activation request for the first UE in response to detecting the BFR activation condition.

21. An apparatus for wireless communication at a second user equipment (UE), comprising:

a memory; and at least one processor coupled to the memory and configured to:

receive, over a sidelink from a first UE, a beam failure report (BFR) addressed to a network entity;

transmit, to the network entity, a BFR uplink transmission comprising the BFR addressed to the network entity;

receive, from the network entity, a beam switching instruction downlink transmission comprising a beam switching instruction addressed to the first UE; and transmit, over the sidelink to the first UE, the beam switching instruction downlink transmission comprising the beam switching instruction addressed to the first UE;

wherein the at least one processor is further configured to:

receive, from the network entity, an activation for the first UE, the activation comprising an instruction from the network entity to activate a BFR relay configuration.

22. The apparatus of claim 21, wherein the at least one processor is further configured to:

receive, over the sidelink from the first UE, an uplink control information (UCI) for a failed downlink transmission and addressed to the network entity; and transmit, to the network entity, the UCI for the failed downlink transmission.

23. The apparatus of claim 21, wherein the network entity comprises a medium access control (MAC) layer and a first radio unit, and wherein the BFR from the first UE identifies the MAC layer of the network entity as a target destination.

24. The apparatus of claim 21, further comprising a transceiver coupled to the at least one processor, wherein the beam switching instruction comprises at least one of a downlink control information (DCI) or a MAC control element (MAC CE).

25. The apparatus of claim 21, wherein the BFR from the first UE comprises one or more of:

a BFR MAC CE having a UE indicated beam switching instruction, an identifier of a beam, or a channel condition measurement history for the first UE.

26. The apparatus of claim 21, wherein the at least one processor is further configured to:

receive, from the network entity, a radio resource control (RRC) configuration for the BFR, the RRC configuration configuring at least one of content for the BFR or a periodicity for the BFR; and transmit, over the sidelink to the first UE, the RRC configuration for the BFR.

27. The apparatus of claim 26, wherein the at least one processor is further configured to:

receive, over the sidelink from the first UE, a periodic sidelink transmission comprising an updated BFR in response to receiving the RRC configuration; and transmit, to the network entity, the periodic sidelink transmission comprising the updated BFR.

28. The apparatus of claim 21, wherein the at least one processor is further configured to:

transmit, over the sidelink the first UE, the activation from the network entity.

29. A method of wireless communication at a first user equipment (UE), comprising:

detecting an occurrence of a beam failure condition for a failed downlink transmission received from a network entity using a first beam;

transmitting, over a sidelink to a second UE, a beam failure report (BFR) in response to detecting the beam failure condition;

receiving, over the sidelink from the second UE, a beam switching instruction to switch from the first beam to a second beam;

receiving, from the network entity, a retransmission of the failed downlink transmission using the second beam; and receiving, over the sidelink from the second UE or from the network entity, an activation comprising an instruction from the network entity to activate a BFR relay configuration.

30. The method of claim 29, wherein the transmitting the BFR to the second UE is triggered in response to the receiving the activation comprising the instruction from the network entity to activate the BFR relay configuration.

* * * * *